(12) United States Patent
Zhang et al.

(10) Patent No.: US 11,699,957 B2
(45) Date of Patent: Jul. 11, 2023

(54) ENERGY CONVERSION SYSTEM, ENERGY CONVERSION METHOD, AND POWER SYSTEM

(71) Applicant: Huawei Digital Power Technologies Co., Ltd., Shenzhen (CN)

(72) Inventors: Wei Zhang, Dongguan (CN); Zhaoxue Cui, Dongguan (CN); Ningbo Feng, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/826,482

(22) Filed: May 27, 2022

(65) Prior Publication Data

US 2022/0286057 A1     Sep. 8, 2022

(30) Foreign Application Priority Data

May 31, 2021   (CN) .......................... 202110602846.2
Sep. 26, 2021  (CN) .......................... 202111129268.1

(51) Int. Cl.
*H01F 3/14*    (2006.01)
*H02M 3/335*   (2006.01)
*B60L 50/60*   (2019.01)
*B60R 16/033*  (2006.01)
*H02J 7/00*    (2006.01)
(Continued)

(52) U.S. Cl.
CPC ......... *H02M 3/33573* (2021.05); *B60L 50/60* (2019.02); *B60R 16/033* (2013.01); *H02J 7/0013* (2013.01); *H02J 7/02* (2013.01); *H02M 3/33576* (2013.01); *H02M 7/219* (2013.01); *B60L 2210/10* (2013.01); *H02J 2207/20* (2020.01)

(58) Field of Classification Search
CPC .................................................. H02M 3/33573
See application file for complete search history.

(56) References Cited

U.S. PATENT DOCUMENTS

2007/0278987 A1   12/2007  Bartholet et al.
2011/0187184 A1   8/2011   Ichikawa
2014/0097792 A1   4/2014   Su
(Continued)

FOREIGN PATENT DOCUMENTS

CN    111434513 A   7/2020
CN    111434514 A   7/2020

*Primary Examiner* — Jared Fureman
*Assistant Examiner* — Esayas G Yeshaw
(74) *Attorney, Agent, or Firm* — Maier & Maier, PLLC

(57) ABSTRACT

An energy conversion system, an energy conversion method, and a power system. The energy conversion system may include a bridge arm conversion module, a direct current to direct current (DC/DC) conversion module, a motor, a bus capacitor, and a control module. The control module may be configured to control a bridge arm switch action in the bridge arm conversion module, drive the motor based on an alternating current input voltage supplied by a power supply, form a bus voltage at two ends of the bus capacitor, and control the DC/DC conversion module to charge a traction battery and an auxiliary battery based on the bus voltage. The traction battery and the auxiliary battery can be charged while the motor is driven, thereby achieving higher energy conversion efficiency, low costs, and strong applicability.

20 Claims, 13 Drawing Sheets

(51) Int. Cl.
*H02J 7/02* (2016.01)
*H02M 7/219* (2006.01)

(56) References Cited

U.S. PATENT DOCUMENTS

2018/0222333 A1* 8/2018 Khaligh ............ H02M 3/33584
2021/0252990 A1* 8/2021 Wang ..................... B60L 53/22

* cited by examiner

ENERGY CONVERSION SYSTEM, ENERGY CONVERSION METHOD, AND POWER SYSTEM

CROSS-REFERENCE TO RELATED APPLICATIONS

This application claims priority to Chinese Patent Application No. 202110602846.2, filed on May 31, 2021 and Chinese Patent Application No. 202111129268.1, filed on Sep. 26, 2021. The disclosures of the aforementioned applications are hereby incorporated by reference in their entireties.

TECHNICAL FIELD

The embodiments relate to the field of power electronics technologies, an energy conversion system, an energy conversion method, and a power system.

BACKGROUND

With the rapid development of new energy vehicles, electric vehicles have become a development trend of new energy vehicles in the future due to their advantages such as high efficiency, energy saving, low noise, and zero emission. A battery charging circuit (that is, a circuit configured to charge a traction battery and an auxiliary battery) and a motor driving circuit (that is, a circuit configured to drive a motor) in the electric vehicle are independent of each other, resulting in a complex structural layout and low integration of the electric vehicle. Therefore, it is particularly important to integrate the battery charging circuit and the motor driving circuit. Currently, a winding of the motor and the motor driving circuit in the electric vehicle may be reused, and a plurality of contactors may be added to the electric vehicle. The motor driving circuit and the plurality of contactors are controlled to be turned on or off to drive the motor or charge the traction battery and the auxiliary battery. However, motor driving power is much greater than battery charging power. As a result, a plurality of large-current contactors is added to the electric vehicle, which leads to an excessive energy loss in a battery charging process. In addition, driving of the motor and charging of the traction battery and the auxiliary battery cannot be performed simultaneously, which leads to weak applicability.

SUMMARY

The embodiments provide an energy conversion system, an energy conversion method, and a power system, to charge a traction battery and an auxiliary battery while driving a motor, thereby achieving higher energy conversion efficiency, low costs, and strong applicability.

According to a first aspect, an energy conversion system. may include a bridge arm conversion module, a direct current to direct current (DC/DC) conversion module, a motor, a bus capacitor, and a control module. A first bridge arm midpoint of the bridge arm conversion module may be connected to an alternating current charging interface, other bridge arm midpoints of the bridge arm conversion module may be respectively connected to three phases of windings in the motor, an input/output end of the bridge arm conversion module may be connected in parallel to a first input/output end of the DC/DC conversion module through the bus capacitor, a second input/output end of the DC/DC conversion module may be connected to a traction battery, a third input/output end of the DC/DC conversion module may be connected to an auxiliary battery, a neutral wire of the motor may be connected to the alternating current charging interface, the neutral wire of the motor may be led out from a common connection end of the three phases of windings, and the alternating current charging interface may be connected to a power supply. The control module may be configured to control a bridge arm switch action in the bridge arm conversion module, drive the motor based on an alternating current input voltage supplied by the power supply, form a bus voltage at two ends of the bus capacitor, and control the DC/DC conversion module to charge the traction battery and the auxiliary battery based on the bus voltage. In this case, the traction battery and the auxiliary battery can be charged while the motor is driven. In the energy conversion system, the bridge arm conversion module and the DC/DC conversion module may be controlled to drive the motor and charge the traction battery and the auxiliary battery, thereby improving energy conversion efficiency. In addition, no large-current contactor needs to be added to a circuit, so that a circuit structure is simple, costs are low, and applicability is strong.

Optionally, in a process of separately charging the traction battery and the auxiliary battery, the input/output end of the bridge arm conversion module may be used as an output end of the bridge arm conversion module, the first input/output end of the DC/DC conversion module may be used as an input end of the DC/DC conversion module to connect in parallel to the bus capacitor, and the second input/output end of the DC/DC conversion module may be used as an output end of the DC/DC conversion module to connect to the traction battery. The control module may control the three phases of windings and the bridge arm conversion module to output a direct current voltage to the DC/DC conversion module based on the alternating current input voltage and control the DC/DC conversion module to charge the traction battery and the auxiliary battery based on the direct current voltage. Herein, the three phases of windings and the bridge arm conversion module may constitute a power factor correction (PFC) circuit. Therefore, the three phases of windings may be understood as an inductor in the power factor correction circuit. In a process of separately driving the motor, the input/output end of the bridge arm conversion module may be used as an input end of the bridge arm conversion module, the first input/output end of the DC/DC conversion module may be used as an output end of the DC/DC conversion module to connect in parallel to the bus capacitor, and the second input/output end of the DC/DC conversion module may be used as an input end of the DC/DC conversion module to connect to the traction battery. The control module may control the DC/DC conversion module to output a direct current voltage to the bridge arm conversion module based on a direct current voltage supplied by the traction battery and control the bridge arm conversion module to convert the direct current voltage into an alternating current voltage to drive the motor. In the energy conversion system, the bridge arm conversion module and the DC/DC conversion module may be controlled to drive the motor or charge the traction battery and the auxiliary battery, and no large-current contactor needs to be added to a circuit, so that a circuit structure is simple, costs are low, and applicability is stronger.

With reference to the first aspect, in a first possible implementation, the bridge arm conversion module includes a first bridge arm switch and a plurality of second bridge arm switches connected in parallel. The first bridge arm switch is connected in parallel to the plurality of second bridge arm switches connected in parallel, and a parallel connection end between the first bridge arm switch and the plurality of second bridge arm switches connected in parallel may be used as the input/output end of the bridge arm conversion module. One bridge arm switch includes an upper bridge arm switch and a lower bridge arm switch connected in series, a series connection point between the upper bridge arm switch and the lower bridge arm switch may be used as a bridge arm midpoint of the bridge arm switch, a bridge arm midpoint of the first bridge arm switch may be used as the first bridge arm midpoint of the bridge arm conversion module, bridge arm midpoints of the plurality of second bridge arm switches may be used as the other bridge arm midpoints of the bridge arm conversion module, and a bridge arm midpoint of one of the plurality of second bridge arm switches may be connected to one of the three phases of windings of the motor.

With reference to the first possible implementation of the first aspect, in a second possible implementation, the control module may be configured to control upper bridge arm switches and lower bridge arm switches in the bridge arm switches to be turned on or off, to drive the motor based on the alternating current input voltage supplied by the power supply and form the bus voltage at the two ends of the bus capacitor. In the energy conversion system, the upper bridge arm switches and the lower bridge arm switches in the bridge arm switches may be controlled to be turned on or off, to drive the motor and supply charging power to charge the traction battery and the auxiliary battery, thereby achieving higher energy conversion efficiency and stronger applicability.

With reference to the second possible implementation of the first aspect, in a third possible implementation, the control module may be configured to generate a control signal of the upper bridge arm switches and the lower bridge arm switches in the bridge arm switches, and control, based on the control signal, the upper bridge arm switches and the lower bridge arm switches in the bridge arm switches to be turned on or off. The control signal may be determined based on a charging voltage and a charging current that are required by the traction battery and the auxiliary battery, a bus voltage required by the bus capacitor, and three phases of currents of the three phases of windings. Herein, the three phases of currents may be determined based on a current required by the motor to reach a target rotational speed and a target torque and an alternating current input current supplied by the power supply. In the energy conversion system, the upper bridge arm switches and the lower bridge arm switches in the bridge arm switches may be controlled based on the control signal to be turned on or off, to drive the motor and supply charging power to charge the traction battery and the auxiliary battery, thereby achieving higher energy conversion efficiency and stronger applicability.

With reference to the second possible implementation of the first aspect, in a fourth possible implementation, the control module may be configured to collect three phases of currents of the three phases of windings and a bus voltage of the bus capacitor. The control module may include one or more functional modules having a voltage/current detection function, for example, a voltage detection circuit or a current detection circuit. The voltage detection circuit may be configured to collect the bus voltage, and the current detection circuit may be configured to collect the three phases of currents. Further, the control module may generate a control signal of the upper bridge arm switches and the lower bridge arm switches in the bridge arm switches based on the three phases of currents, the bus voltage, and the alternating current input voltage supplied by the power supply, and control, based on the control signal, the upper bridge arm switches and the lower bridge arm switches in the bridge arm switches to be turned on or off. In the energy conversion system, the upper bridge arm switches and the lower bridge arm switches in the bridge arm switches may be controlled based on the control signal to be turned on or off, to drive the motor and supply charging power to charge the traction battery and the auxiliary battery, thereby achieving higher energy conversion efficiency and stronger applicability.

With reference to any one of the first aspect to the fourth possible implementation of the first aspect, in a fifth possible implementation, the DC/DC conversion module may include a first DC/DC conversion unit and a second DC/DC conversion unit, a first input/output end of the first DC/DC conversion unit may be used as the first input/output end of the DC/DC conversion module, a second input/output end of the first DC/DC conversion unit may be used as the second input/output end of the DC/DC conversion module and connected in parallel to a first input/output end of the second DC/DC conversion unit through the traction battery, and a second input/output end of the second DC/DC conversion unit may be used as the third input/output end of the DC/DC conversion module to connect to the auxiliary battery. The first DC/DC conversion unit may be configured to convert the bus voltage into a first direct current voltage to charge the traction battery, and the second DC/DC conversion unit may be configured to perform voltage conversion on the first direct current voltage of the traction battery to charge the auxiliary battery, to charge the traction battery and the auxiliary battery. In the energy conversion system, the first DC/DC conversion unit and the second DC/DC conversion unit may be controlled to charge the traction battery and the auxiliary battery, thereby achieving higher energy conversion efficiency and stronger applicability.

With reference to any one of the first aspect to the fifth possible implementation of the first aspect, in a sixth possible implementation, the energy conversion system further includes a first switch, and the first bridge arm midpoint of the bridge arm conversion module or the neutral wire of the motor may be connected to the alternating current charging interface through the first switch. The control module may be configured to: when the alternating current charging interface is connected to an external device, control the first switch to be turned on, control the DC/DC conversion module to output a second direct current voltage to the bridge arm conversion module based on the direct current voltage supplied by the traction battery, and control the bridge arm conversion module to convert the second direct current voltage into an alternating current voltage, to drive the motor and charge the external device. In the energy conversion, the DC/DC conversion module and the bridge arm conversion module may be controlled to drive the motor and charge the external device, thereby achieving higher energy conversion efficiency, a simple circuit structure, low costs, and stronger applicability.

According to a second aspect, an energy conversion method may be applicable to the control module in the energy conversion system provided in any one of the first aspect to the sixth possible implementation of the first aspect. In the method, the control module may control a bridge arm switch action in the bridge arm conversion module, to drive the motor based on an alternating current input voltage supplied by the power supply and form a bus voltage at the two ends of the bus capacitor. The control module may control the DC/DC conversion module to charge the traction battery and the auxiliary battery based on the bus voltage.

With reference to the second aspect, in a first possible implementation, the control module may control upper bridge arm switches and lower bridge arm switches in bridge arm switches to be turned on or off, to drive the motor based on the alternating current input voltage supplied by the power supply and form the bus voltage at the two ends of the bus capacitor.

With reference to the first possible implementation of the second aspect, in a second possible implementation, the control module may obtain a current required by the motor to reach a target rotational speed and a target torque and an alternating current input current supplied by the power supply, and determine three phases of currents of the three phases of windings based on the current required by the motor to reach the target rotational speed and the target torque and the alternating current input current. Further, the control module may obtain a charging voltage and a charging current that are required by the traction battery and the auxiliary battery and a bus voltage required by the bus capacitor, generate a control signal of the upper bridge arm switches and the lower bridge arm switches in the bridge arm switches based on the charging voltage and the charging current that are required by the traction battery and the auxiliary battery, the bus voltage required by the bus capacitor, and the three phases of currents, and control, based on the control signal, the upper bridge arm switches and the lower bridge arm switches in the bridge arm switches to be turned on or off.

With reference to the first possible implementation of the second aspect, in a third possible implementation, the control module may collect three phases of currents of the three phases of windings and a bus voltage of the bus capacitor. For example, the control module may collect the three phases of currents based on a current detection circuit and collect the bus voltage based on a voltage detection circuit. Further, the control module may generate a control signal of the upper bridge arm switches and the lower bridge arm switches in the bridge arm switches based on the three phases of currents, the bus voltage, and the alternating current input voltage supplied by the power supply, and control, based on the control signal, the upper bridge arm switches and the lower bridge arm switches in the bridge arm switches to be turned on or off.

With reference to any one of the second aspect to the third possible implementation of the second aspect, in a fourth possible implementation, the control module may control the first DC/DC conversion unit to convert the bus voltage into a first direct current voltage to charge the traction battery. In this case, the control module may control the second DC/DC conversion unit to perform voltage conversion on the first direct current voltage of the traction battery to charge the auxiliary battery.

With reference to any one of the second aspect to the fourth possible implementation of the second aspect, in a fifth possible implementation, when the alternating current charging interface is connected to an external device, the control module may control the first switch to be turned on, control the DC/DC conversion module to output a second direct current voltage to the bridge arm conversion module based on the direct current voltage supplied by the traction battery, and control the bridge arm conversion module to convert the second direct current voltage into an alternating current voltage, to drive the motor and charge the external device.

According to a third aspect, a power system may include a traction battery, an auxiliary battery, and the energy conversion system provided in any one of the first aspect to the fifth possible implementation of the first aspect. In the power system, energy conversion efficiency of the power system can be improved, and the power system has a simple structure, low costs, and high integration.

With reference to the third aspect, in a first possible implementation, the power system further includes a positive temperature coefficient heater and a second switch connected in series. The positive temperature coefficient heater and the second switch connected in series are connected in parallel to the traction battery. The control module may be configured to control the second switch to be turned on, control the three phases of windings and the bridge arm conversion module to convert an alternating current input voltage of the power supply into a third direct current voltage, and control the DC/DC conversion module to supply power to the positive temperature coefficient heater based on the third direct current voltage, so that the positive temperature coefficient heater works. In the power system, integrated control may be performed on the traction battery, the auxiliary battery, and the positive temperature coefficient heater, so that a high-voltage link is simple, costs are lower, and applicability is stronger.

With reference to the third aspect, in a second possible implementation, the power system further includes a positive temperature coefficient (PTC) heater and a second switch connected in series. The positive temperature coefficient heater and the second switch connected in series are connected in parallel to the traction battery. The control module is further configured to control the second switch to be turned on, and supply power to the positive temperature coefficient heater based on a direct current voltage supplied by the traction battery, so that the positive temperature coefficient heater works. In the power system, integrated control may be performed on the traction battery, the auxiliary battery, and the positive temperature coefficient heater, so that a high-voltage link is simple, costs are lower, and applicability is stronger.

The bridge arm conversion module and the DC/DC conversion module may be controlled to drive the motor and charge the traction battery and the auxiliary battery, thereby improving energy conversion efficiency. In addition, no large-current contactor needs to be added to a circuit, so that a circuit structure is simple, costs are low, and applicability is strong.

DETAILED DESCRIPTION OF THE EMBODIMENTS

An electric vehicle may refer to a vehicle that is powered by an on-board power supply, runs with a wheel driven by a motor, and meets requirements of road traffic and safety regulations. Generally, the on-board power supply may supply direct current energy for the motor of the electric vehicle, and the motor of the electric vehicle may convert the direct current energy supplied by the on-board power supply into mechanical energy and drive the wheel and a working apparatus by using a transmission apparatus or directly, to drive the electric vehicle to run. Electric vehicles use a traction battery (such as a lead-acid storage battery or other storage batteries) as an on-board power supply, which has a limited capacity. Therefore, to maximize a driving range of the electric vehicles, an energy feedback technology is used for motors of most electric vehicles. That is, when the electric vehicle is braked, a motor controller feeds back kinetic energy lost by a wheel to a traction battery and makes the motor in a power generation state to deliver generated electric energy to the traction battery, to complete energy feedback, thereby prolonging a driving range of the electric vehicle. An energy conversion system is applicable to a traction battery and an auxiliary battery in an electric device, to charge the traction battery and the auxiliary battery and drive a motor to make the electric device work. The electric device herein may include, but is not limited to, an electric vehicle, an electric amusement device, an electric train, an electric bicycle, a golf cart, or other electric devices. This may be determined based on an actual application scenario and is not limited herein.

Figure 1:
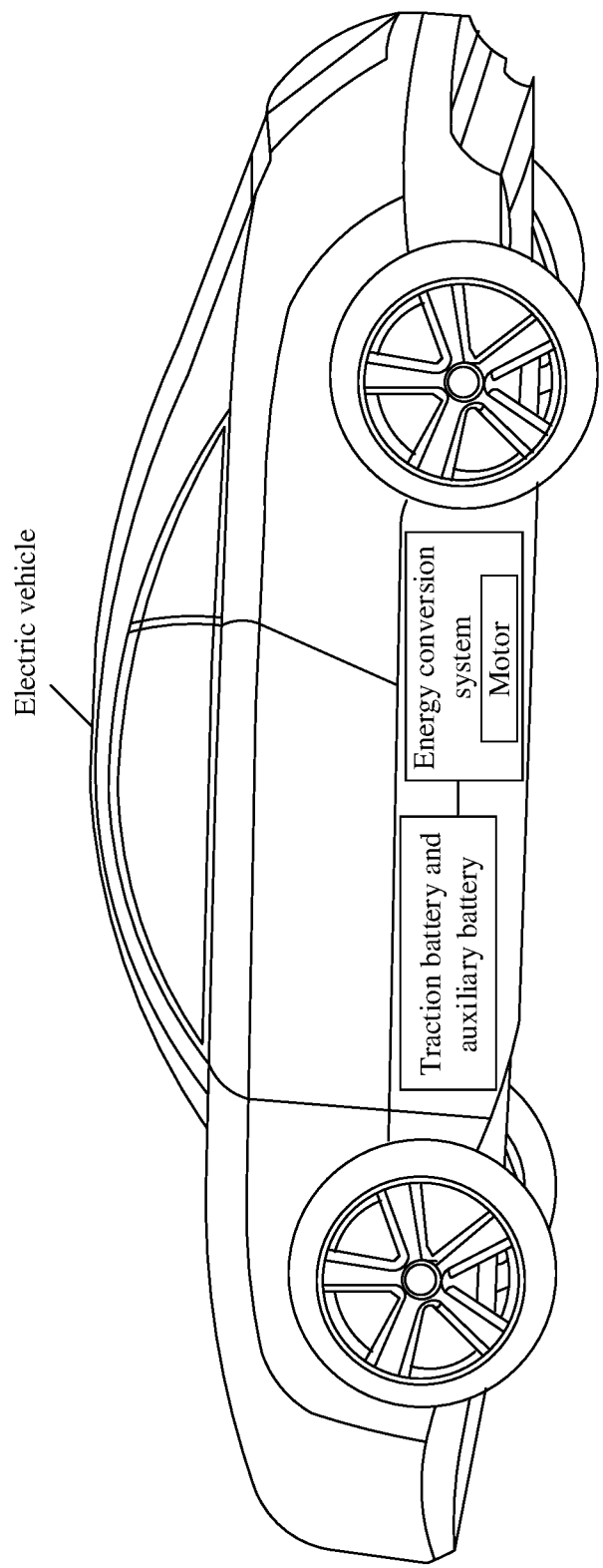
FIG. 1 is a schematic diagram of an application scenario of an energy conversion system.

The energy conversion system may be adapted to different application scenarios, for example, an electric vehicle application scenario and an electric amusement device application scenario. The electric vehicle application scenario is used as an example for description. FIG. 1 is a schematic diagram of an application scenario of an energy conversion system. In the electric vehicle application scenario, as shown in FIG. 1, the electric vehicle includes a traction battery, an auxiliary battery, and an energy conversion system. A motor in the energy conversion system may be understood as a motor (such as an air conditioner compressor motor) in the electric vehicle. When the traction battery and the auxiliary battery need to be charged, the energy conversion system may supply direct current energy to the traction battery and the auxiliary battery, to charge the traction battery and the auxiliary battery. After the traction battery is charged, the traction battery may supply direct current energy to a drive motor for vehicle driving in the electric vehicle, and the drive motor may convert the direct current energy supplied by the traction battery into mechanical energy, to drive the electric vehicle to run. When the motor needs to be driven, another functional module in the energy conversion system may supply alternating current energy to the motor to drive the motor to work. In this case, an air conditioning refrigeration system in the electric vehicle can work normally. Optionally, the energy conversion system may alternatively drive the motor and charge the traction battery and the auxiliary battery. In this way, the batteries are charged while the air conditioning refrigeration system works, which meets different requirements of the electric vehicle, and simplifies a structural layout of the electric vehicle, thereby achieving low costs, a small size, high integration, and stronger applicability.

The following illustrates an energy conversion system and a power system and their working principles with reference to FIG. 2 to FIG. 11.

Figure 2:
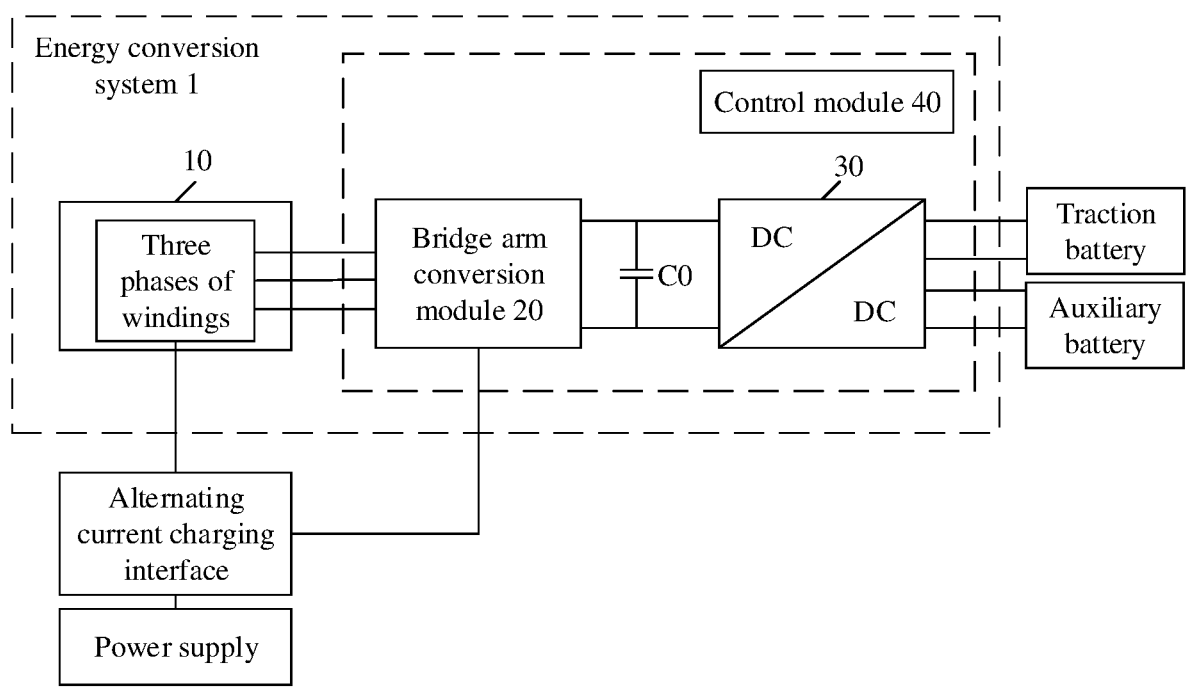
FIG. 2 is a schematic diagram of a structure of an energy conversion system.

FIG. 2 is a schematic diagram of a structure of an energy conversion system. As shown in FIG. 2, the energy conversion system 1 includes a motor 10, a bridge arm conversion module 20, a DC/DC conversion module 30, a control module 40, and a bus capacitor C0. A first bridge arm midpoint of the bridge arm conversion module 20 may be connected to an alternating current charging interface, and other bridge arm midpoints of the bridge arm conversion module 20 may be respectively connected to three phases of windings in the motor 10. An input/output end of the bridge arm conversion module 20 may be connected in parallel to a first input/output end of the DC/DC conversion module 30 through the bus capacitor C0. A second input/output end of the DC/DC conversion module 30 may be connected to a traction battery (which may also be referred to as a power battery). A third input/output end of the DC/DC conversion module 30 may be connected to an auxiliary battery (which may also be referred to as an auxiliary storage battery). A neutral wire of the motor 10 may be connected to the alternating current charging interface. The neutral wire of the motor 10 may be led out from a common connection end of the three phases of windings. The alternating current charging interface may be connected to a power supply (such as an alternating current power supply or an alternating current charging pile). Herein, the three phases of windings and the DC/DC conversion module 30 may constitute a power factor correction circuit, to implement a boost conversion function, a buck conversion function, and a power factor correction function. When the first bridge arm midpoint of the bridge arm conversion module 20 is connected to a neutral wire of the alternating current charging interface, the neutral wire of the motor 10 may be connected to a live wire of the alternating current charging interface. When the first bridge arm midpoint of the bridge arm conversion module 20 is connected to the live wire of the alternating current charging interface, the neutral wire of the motor 10 may be connected to the neutral wire of the alternating current charging interface. This may be determined based on an actual application scenario and is not limited herein.

In some feasible implementations, the control module 40, the bridge arm conversion module 20, and the DC/DC conversion module 30 may be integrated on a printed circuit board (PCB). The control module 40 (which may also be referred to as an integrated controller) may control the bridge arm conversion module 20 and the DC/DC conversion module 30 to be turned on or off. The PCB is a support body for electronic components and is also a carrier for electrically connecting the electronic components. The control module 40 may control a bridge arm switch action (that is, turn on or off a bridge arm switch) in the bridge arm conversion module 20, to drive the motor 10 based on an alternating current input voltage supplied by the power supply and form a bus voltage at two ends of the bus capacitor C0, and control the DC/DC conversion module 30 to charge the traction battery and the auxiliary battery based on the bus voltage. In this way, the motor can be driven, and the traction battery and the auxiliary battery can be charged. The motor 10 herein may be a motor in an electric vehicle, for example, a drive motor for vehicle driving, an air conditioner compressor motor, or other motors. The air conditioner compressor motor is used as an example for description. The control module 40 may control a bridge arm switch action in the bridge arm conversion module 20, to drive the motor 10 based on the alternating current input voltage supplied by the power supply and form a bus voltage at the two ends of the bus capacitor C0. In this case, an air conditioning refrigeration system in the electric vehicle can work normally. Further, the control module 40 may further control the DC/DC conversion module 30 to charge the traction battery and the auxiliary battery based on the bus voltage of the bus capacitor C0. In this way, the traction battery and the auxiliary battery can be charged while the air conditioning refrigeration system works.

Optionally, in some feasible implementations, in a process of separately charging the traction battery and the auxiliary battery, the input/output end of the bridge arm conversion module 20 may be used as an output end of the bridge arm conversion module 20, the first input/output end of the DC/DC conversion module 30 may be used as an input end of the DC/DC conversion module 30 to connect in parallel to the bus capacitor C0, the second input/output end of the DC/DC conversion module 30 may be used as an output end of the DC/DC conversion module 30 to connect to the traction battery, and the third input/output end of the DC/DC conversion module 30 may be used as an output end of the DC/DC conversion module 30 to connect to the auxiliary battery. The control module 40 may control the three phases of windings in the motor 10 and the bridge arm conversion module 20 to perform boost conversion on the alternating current input voltage supplied by the power supply to output a direct current voltage to the DC/DC conversion module 30 and control the DC/DC conversion module 30 to charge the traction battery and the auxiliary battery based on the direct current voltage. In this case, the bus capacitor C0 may be used as a filter capacitor to filter a voltage signal passing through the bus capacitor C0 and output the voltage signal to the DC/DC conversion module 30. The voltage signal may be used to determine the direct current voltage input to the DC/DC conversion module 30.

Optionally, in some feasible implementations, in a process of separately driving the motor 10, the input/output end of the bridge arm conversion module 20 may be used as an input end of the bridge arm conversion module 20, the first input/output end of the DC/DC conversion module 30 may be used as an output end of the DC/DC conversion module 30 to connect in parallel to the bus capacitor C0, the second input/output end of the DC/DC conversion module 30 may be used as an input end of the DC/DC conversion module 30 to connect to the traction battery, and the alternating current charging interface is not connected to a power supply (for example, a switch may be disposed between the alternating current charging interface and the neutral wire of the three phases of windings, and the switch may be controlled to be open). The control module 40 may control the DC/DC conversion module 30 to output a direct current voltage to the bridge arm conversion module 20 based on a direct current voltage supplied by the traction battery and control the bridge arm conversion module 20 to perform buck conversion on the direct current voltage to obtain an alternating current voltage, to drive the motor 10. In this case, the bus capacitor C0 may be used as a filter capacitor to filter a voltage signal passing through the bus capacitor C0 and output the voltage signal to the bridge arm conversion module 20. The voltage signal may be used to determine the direct current voltage input to the bridge arm conversion module 20. Optionally, the third input/output end of the DC/DC conversion module 30 may be used as an input end of the DC/DC conversion module 30 to connect to the auxiliary battery. The control module 40 may control the DC/DC conversion module 30 to output a direct current voltage to the bridge arm conversion module 20 based on a direct current voltage supplied by the auxiliary battery and control the bridge arm conversion module 20 to perform buck conversion on the direct current voltage to obtain an alternating current voltage, to drive the motor 10. This may be determined based on an actual application scenario and is not limited herein.

In some feasible implementations, the bridge arm conversion module 20 includes a first bridge arm switch and a plurality of second bridge arm switches connected in parallel. The first bridge arm switch is connected in parallel to the plurality of second bridge arm switches connected in parallel, and a parallel connection end between the first bridge arm switch and the plurality of second bridge arm switches connected in parallel may be used as the input/output end of the bridge arm conversion module 20. One bridge arm switch includes an upper bridge arm switch (which may also be referred to as an upper transistor switch) and a lower bridge arm switch (which may also be referred to as a lower transistor switch) connected in series. A series connection point between the upper bridge arm switch and the lower bridge arm switch may be used as a bridge arm midpoint of the bridge arm switch. A bridge arm midpoint of the first bridge arm switch may be used as the first bridge arm midpoint of the bridge arm conversion module 20, and bridge arm midpoints of the plurality of second bridge arm switches may be used as the other bridge arm midpoints of the bridge arm conversion module 20. A bridge arm midpoint of one of the plurality of second bridge arm switches may be connected to one of the three phases of windings of the motor 10. Herein, the first bridge arm switch and the plurality of second bridge arm switches may be metal-oxide-semiconductor field-effect transistors (MOSFETs) or insulated gate bipolar transistors (IGBT) made of a semiconductor material such as silicon (Si), a third-generation wide-band-gap semiconductor material such as silicon carbide (SiC), gallium nitride (GaN), diamond, or zinc oxide (ZnO), or other materials. This may be determined based on an actual application scenario and is not limited herein.

Figure 3:
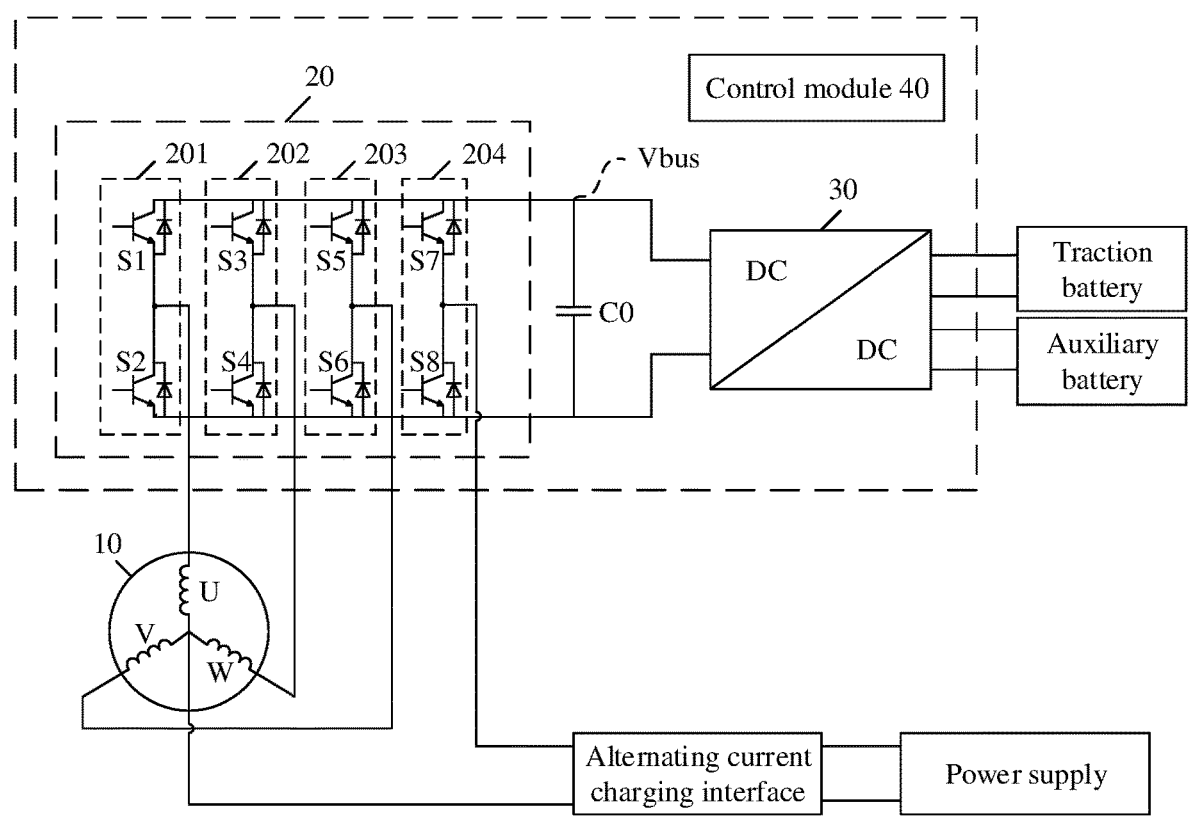
FIG. 3 is another schematic diagram of a structure of an energy conversion system.

FIG. 3 is another schematic diagram of a structure of an energy conversion system. For ease of description, the following uses three second bridge arm switches as an example for description. As shown in FIG. 3, the bridge arm conversion module 20 shown in FIG. 2 includes a first bridge arm switch 204 and three second bridge arm switches (for example, a bridge arm switch 201 to a bridge arm switch 203) connected in parallel. The three phases of windings may include a winding V, a winding U, and a winding W. The winding V, the winding U, and the winding W are windings having a same frequency and amplitude. Herein, the bridge arm switch 201 to the bridge arm switch 204 are all IGBTs, the bridge arm switch 201 to the bridge arm switch 204 are connected in parallel, and a parallel connection end between the bridge arm switch 201 to the bridge arm switch 204 may be used as the input/output end of the bridge arm conversion module 20. The bridge arm switch 201 includes an upper bridge arm switch S1 and a lower bridge arm switch S2 connected in series, and a series connection point between the upper bridge arm switch S1 and the lower bridge arm switch S2 may be used as a bridge arm midpoint of the bridge arm switch 201 to connect to the winding U. The bridge arm switch 202 includes an upper bridge arm switch S3 and a lower bridge arm switch S4 connected in series, and a series connection point between the upper bridge arm switch S3 and the lower bridge arm switch S4 may be used as a bridge arm midpoint of the bridge arm switch 202 to connect to the winding W. The bridge arm switch 203 includes an upper bridge arm switch S5 and a lower bridge arm switch S6 connected in series, and a series connection point between the upper bridge arm switch S5 and the lower bridge arm switch S6 may be used as a bridge arm midpoint of the bridge arm switch 203 to connect to the winding V. Herein, the bridge arm midpoint of the bridge arm switch 201, the bridge arm midpoint of the bridge arm switch 202, and the bridge arm midpoint of the bridge arm switch 203 may be used as the other bridge arm midpoints of the bridge arm conversion module 20. The bridge arm switch 204 includes an upper bridge arm switch S7 and a lower bridge arm switch S8 connected in series, and a series connection point between the upper bridge arm switch S7 and the lower bridge arm switch S8 may be used as a bridge arm midpoint (that is, the first bridge arm midpoint of the bridge arm conversion module 20) of the bridge arm switch 204 to connect to the alternating current charging interface.

In some feasible implementations, the control module 40 may generate a control signal of the upper bridge arm switches and the lower bridge arm switches in the bridge arm switch 201 to the bridge arm switch 204. The control signal herein may be a pulse width modulation PWM) signal. In the control signal, 1 indicates a switch to be turned on, and 0 indicates a switch to be turned off. The control signal may be determined based on a charging voltage and a charging current that are required by the traction battery and the auxiliary battery, a bus voltage required by the bus capacitor C0, and three phases of currents of the three phases of windings. The charging current required by the traction battery and the auxiliary battery may be understood as a current on the neutral wire of the motor 10 or an alternating current input current of the power supply, and the bus voltage required by the bus capacitor C0 may be a voltage value configured by the system or a voltage value configured by a user. Herein, the three phases of currents (that is, a current $I_v$ of the winding V, a current $I_u$ of the winding U, and a current $I_w$ of the winding W) may be determined based on a current required by the motor 10 to reach a target rotational speed and a target torque and the alternating current input current supplied by the power supply. The target torque and the target rotational speed may be parameters configured by the energy conversion system or parameters configured by the user. The current required by the motor 10 to reach the target rotational speed and the target torque may include a current $I_{v1}$ required by the winding V, a current $I_{u1}$ required by the winding U, and a current $I_{w1}$ required by the winding W, and the alternating current input current supplied by the power supply may be represented as I. Therefore, the current $I_v$ of the winding V is $(I_{v1}+I/3)$, the current $I_u$ of the winding U is $(I_{u1}+I/3)$, and the current $I_{w1}$ of the winding W is $(I_{w1}+I/3)$. Further, the control module 40 may control, based on the control signal, the upper bridge arm switches and the lower bridge arm switches in the bridge arm switch 201 to the bridge arm switch 204 to be turned on or off, to drive the motor 10 based on the alternating current input voltage supplied by the power supply and form a bus voltage (Vbus) at the two ends of the bus capacitor C0, and control the DC/DC conversion module 30 to convert the bus voltage into a target direct current voltage, to charge the traction battery and the auxiliary battery. In this way, the traction battery and the auxiliary battery can be charged while the motor is driven.

Optionally, in some feasible implementations, the control module 40 may collect three phases of currents of the three phases of windings (that is, a current $I_v$ of the winding V, a current $I_u$ of the winding U, and a current $I_w$ of the winding W) and a bus voltage of the bus capacitor C0. It may be understood that the control module 40 may include one or more functional modules having a current detection function, for example, a current detection circuit, which may be configured to collect the three phases of currents of the three phases of windings. The control module 40 may further include one or more functional modules having a voltage detection function, for example, a voltage detection circuit, which may be configured to collect the bus voltage of the bus capacitor C0. Further, the control module 40 may generate a control signal of the upper bridge arm switches and the lower bridge arm switches in the bridge arm switch 201 to the bridge arm switch 204 based on the current $I_v$ of the winding V, the current $I_u$ of the winding U, the current $I_w$ of the winding W, the bus voltage, and the alternating current input voltage supplied by the power supply, and control, based on the control signal, the upper bridge arm switches and the lower bridge arm switches in the bridge arm switches to be turned on or off. It may be understood that the control module 40 may control, based on the control signal, the upper bridge arm switches and the lower bridge arm switches in the bridge arm switches to be turned on or off, to drive the motor 10 and supply charging power to charge the traction battery and the auxiliary battery, thereby achieving higher energy conversion efficiency and stronger applicability.

Figure 4A:
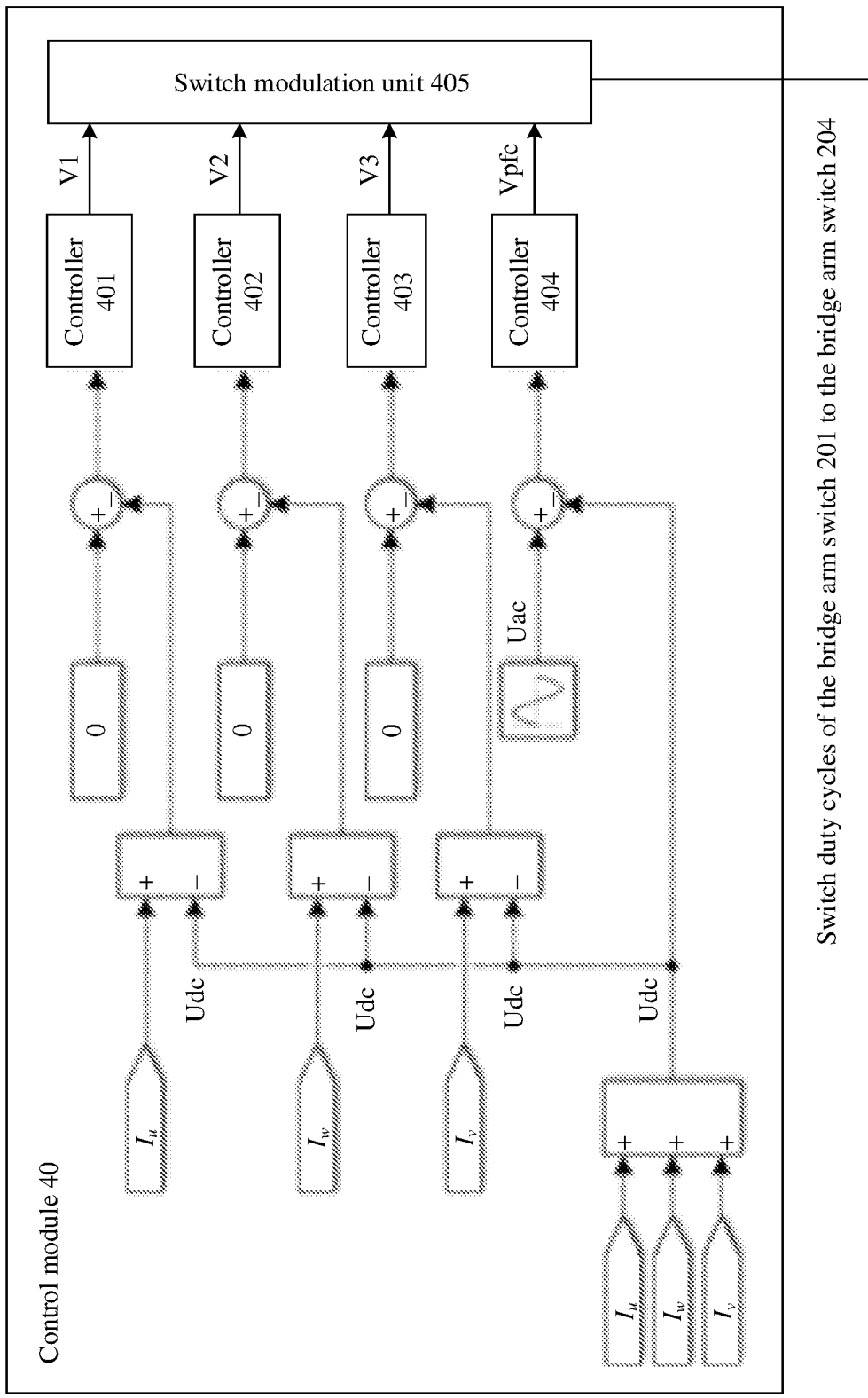
FIG. 4A and FIG. 4B are another schematic diagram of a structure of an energy conversion system.
Figure 4B:
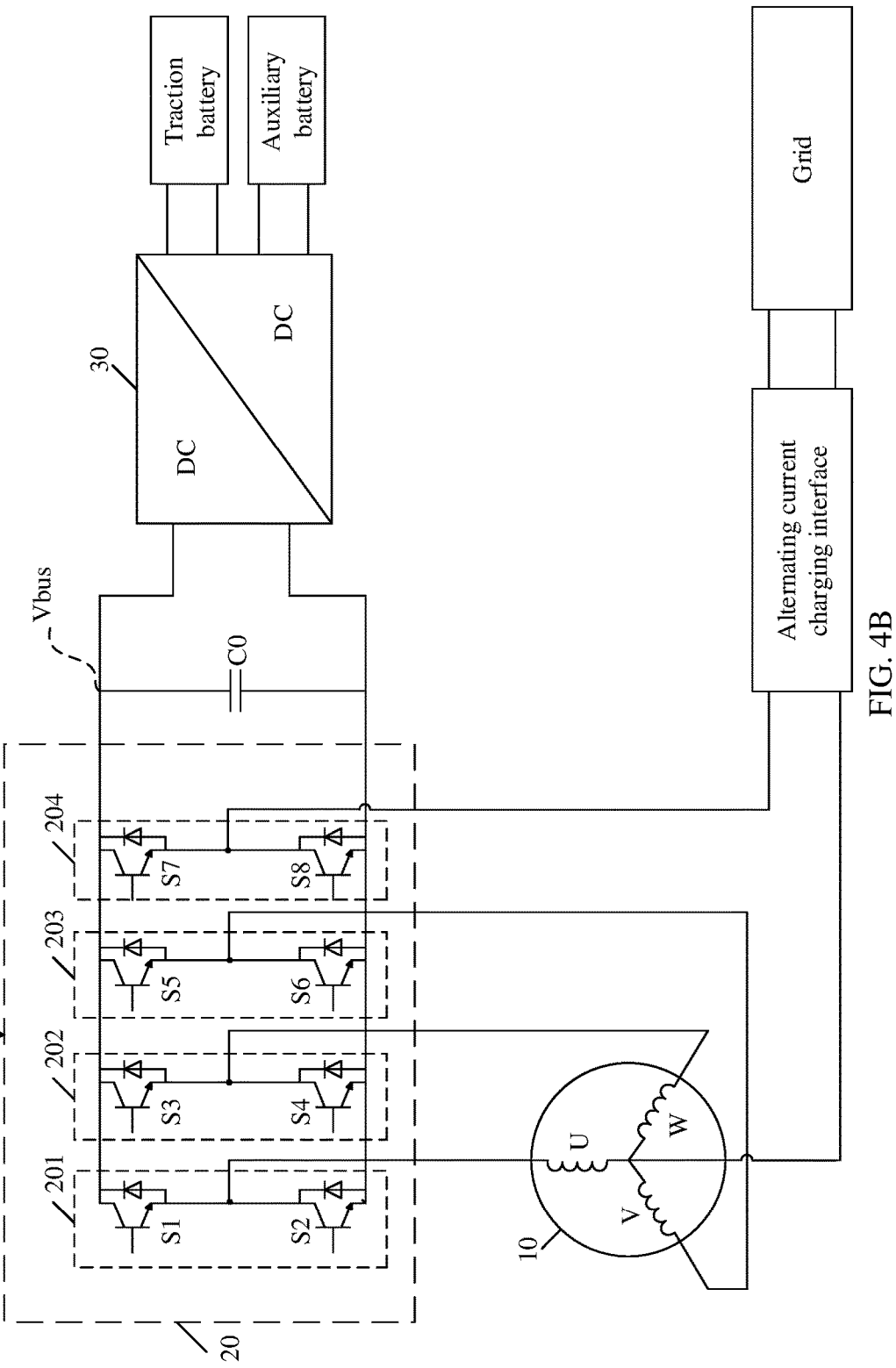

In some feasible implementations, for ease of description, the following provides a description by using an example in which the control signal is a switch duty cycle. Details are not described below again. FIG. 4A and FIG. 4B are another schematic diagram of a structure of an energy conversion system. As shown in FIG. 4A and FIG. 4B, the control module 40 shown in FIG. 3 includes a controller 401 to a controller 404 and a switch modulation unit 405. The controller 401 to the controller 404 may include but are not limited to a discrete PID controller (P represents proportion, I represents integral, and D represents differential). The controllers 401 to 403 may calculate, based on a motor control algorithm, difference components (that is, differential mode voltages) of three phases of voltages required by the motor 10. The controller 404 may calculate a voltage difference (that is, a common mode voltage) between the neutral wire of the motor 10 and the bridge arm midpoint of the bridge arm switch 204 (that is, a power frequency bridge arm) based on a PFC control algorithm. One or more functional units for switch modulation (for example, calculating a switch duty cycle) in the control module may be collectively referred to as a switch modulation unit. When switch modulation needs to be performed for the bridge arm switch 201 to the bridge arm switch 204 and the power supply is a grid, the controller 401 may perform calculation based on the current $I_u$ of the winding U and the bus voltage (Udc) of the bus capacitor C0 by using the motor control algorithm, to obtain a differential mode voltage V1 required by the winding U. The controller 402 may perform calculation based on the current $I_w$ of the winding W and the bus voltage Udc by using the motor control algorithm, to obtain a differential mode voltage V2 required by the winding W. The controller 403 may perform calculation based on the current $I_v$ of the winding V and the bus voltage Udc by using the motor control algorithm, to obtain a differential mode voltage V3 required by the winding V. The controller 404 may perform calculation based on the current $I_v$ of the winding V, the current $I_u$ of the winding U, the current $I_w$ of the winding W, the bus voltage Udc, and the alternating current input voltage (Uac) of the grid by using the PFC control algorithm, to obtain a common mode voltage Vpfc.

In some feasible implementations, as shown in FIG. 4A and FIG. 4B, the switch modulation unit 405 may determine switch duty cycles of the upper bridge arm switches and the lower bridge arm switches in the bridge arm switch 201 to the bridge arm switch 204 based on the differential mode voltage V1, the differential mode voltage V2, the differential mode voltage V3, the common mode voltage Vpfc, and the bus voltage Udc. An upper bridge arm switch and a lower bridge arm switch in each bridge arm switch are complementarily turned on. In other words, the lower bridge arm switch is turned off when the upper bridge arm switch is turned on, or the lower bridge arm switch is turned on when the upper bridge arm switch is turned off. The switch modulation unit 405 may determine an intermediate duty cycle (Dpfc) based on the common mode voltage Vpfc and the bus voltage Udc, for example, Dpfc=Vpfc/Udc. The intermediate duty cycle Dpfc may be used to calculate the switch duty cycles of the bridge arm switch 201 to the bridge arm switch 204. Further, the switch modulation unit 405 may determine a difference between 0.5 and the intermediate duty cycle Dpfc as a switch duty cycle (which may be represented as D0=0.5−Dpfc, where D0 is greater than or equal to 0 and is less than or equal to 1) of the bridge arm switch 204, and determine a switch duty cycle (which may be represented as D1) of the bridge arm switch 201 based on the switch duty cycle D0, the differential mode voltage V1, the intermediate duty cycle Dpfc, and the bus voltage Udc, for example, D1=V1/Udc+Dpfc+D0. In this case, the switch modulation unit 405 may further determine a switch duty cycle (which may be represented as D2) of the bridge arm switch 202 based on the switch duty cycle D0, the differential mode voltage V2, the intermediate duty cycle Dpfc, and the bus voltage Udc, for example, D2=V2/Udc+Dpfc+D0; and determine a switch duty cycle (which may be expressed as D3) of the bridge arm switch 203 based on the switch duty cycle D0, the differential mode voltage V3, the intermediate duty cycle Dpfc, and the bus voltage Udc, for example, D3=V3/Udc+Dpfc+D0. After obtaining the switch duty cycles of the bridge arm switches, the switch modulation unit 405 may control, based on the switch duty cycle D0, the switch duty cycle D1, the switch duty cycle D2, and the switch duty cycle D3, the upper bridge arm switches and the lower bridge arm switches in the bridge arm switches to be turned on or off, to implement a motor control function (that is, separately drive the motor 10), or implement closed-loop control over a grid-side current (that is, separately charge the traction battery and the auxiliary battery), or drive the motor 10 and supply charging power to charge the traction battery and the auxiliary battery, thereby achieving higher energy conversion efficiency, more flexible system operation, and stronger applicability.

Figure 5:
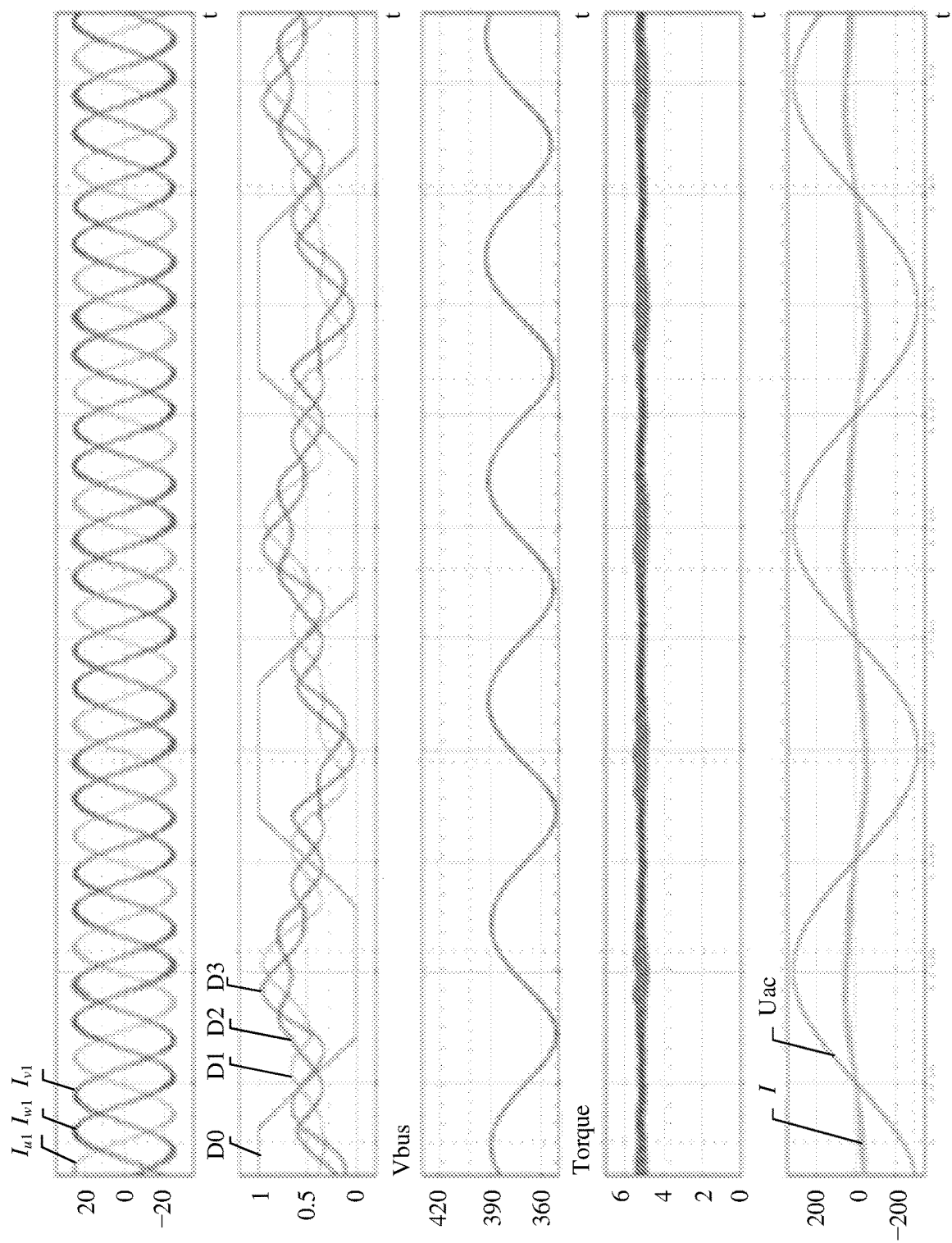
FIG. 5 is a schematic diagram of a switch modulation waveform of an energy conversion system.

In some feasible implementations, when the traction battery and the auxiliary battery are charged while the motor 10 is driven, for waveforms corresponding to the switch duty cycles (that is, the switch duty cycle D0, the switch duty cycle D1, the switch duty cycle D2, and the switch duty cycle D3) of the bridge arm switches, refer to FIG. 5. FIG. 5 is a schematic diagram of a switch modulation waveform of an energy conversion system. As shown in FIG. 5, the control module 40 may control, based on the switch duty cycle D0, the switch duty cycle D1, the switch duty cycle D2, and the switch duty cycle D3 (duty cycles corresponding to duty cycle waveforms D0, D1, D2, and D3 shown in FIG. 5), the upper bridge arm switches and the lower bridge arm switches in the bridge arm switches to be turned on or off, to drive the motor 10 based on the alternating current input voltage Uac of the grid and form the bus voltage Vbus at the two ends of the bus capacitor C0, and control the DC/DC conversion module 30 to charge the traction battery and the auxiliary battery based on the bus voltage Vbus. In this way, the motor 10 is driven, and charging power is supplied to charge the traction battery and the auxiliary battery. In this case, the motor 10 can reach a target torque (output torque corresponding to a torque waveform shown in FIG. 5), a differential mode current $I_{v1}$ (current corresponding to a current waveform $I_{v1}$ shown in FIG. 5) of the winding V is $(I_v-I/3)$, a differential mode current $I_{u1}$ (current corresponding to a current waveform $I_{u1}$ shown in FIG. 5) of the winding U is $(I_u-I/3)$, and a differential mode current $I_{w1}$ (current corresponding to a current waveform $I_{w1}$ shown in FIG. 5) of the winding W is $(I_w-I/3)$. I is the grid-side current (that is, the alternating current input current supplied by the power supply, which is a current corresponding to a current waveform I shown in FIG. 5), and $I=I_v+I_u+I_w$. It can be understood from above that, the control module 40 can control bridge arm switch actions based on the switch duty cycle D0 to the switch duty cycle D3, to drive the motor 10 and charge the traction battery and the auxiliary battery, thereby further achieving higher energy conversion efficiency, more flexible system operation, lower costs, and stronger applicability.

Figure 6:
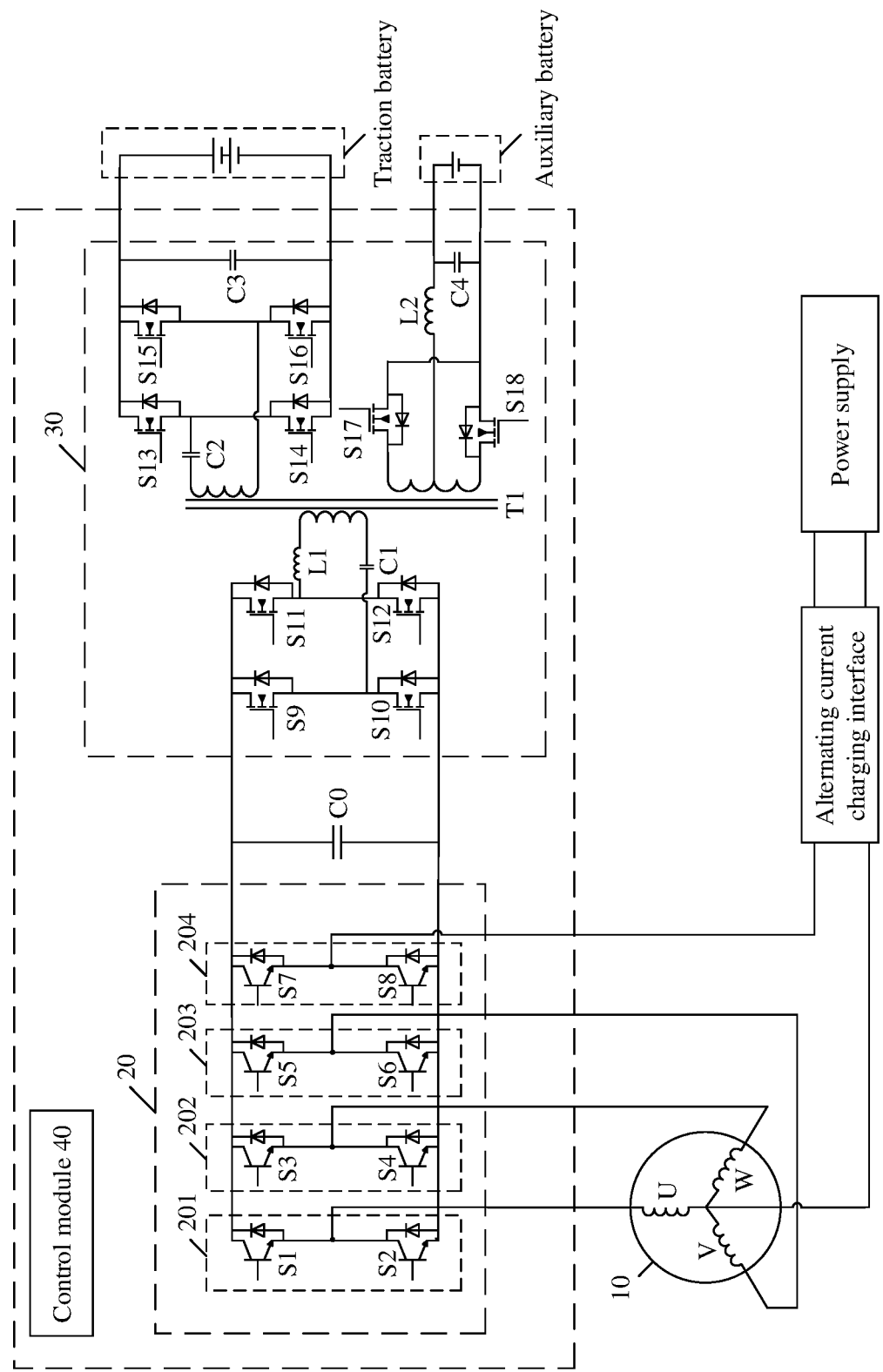
FIG. 6 is another schematic diagram of a structure of an energy conversion system.

In some feasible implementations, a circuit topology of the DC/DC conversion module 30 may include a dual-active full-bridge circuit, a resonant circuit (such as an LLC resonant circuit or a CLLC resonant circuit), or a DC/DC conversion circuit of another type. FIG. 6 is another schematic diagram of a structure of an energy conversion system. As shown in FIG. 6, the DC/DC conversion module 30 shown in FIG. 3 includes a switch S9 to a switch S18, a filter capacitor C1 and a filter capacitor C2, an inductor L1 and an inductor L2, a transformer T1, and a capacitor C3 and a capacitor C4. The DC/DC conversion module 30 herein may include two first input/output ends, two second input/output ends, and two third input/output ends. A source of the switch S9 is connected to a drain of the switch S10, and the source of the switch S9 is connected to a primary side of the transformer T1 by using the filter capacitor C1. After connected, a drain of the switch S9 and a drain of the switch S11 are used as one first input/output end of the DC/DC conversion module 30 to connect to one end of the bus capacitor C0. A source of the switch S11 is connected to a drain of the switch S12, and the source of the switch S11 is connected to the primary side of the transformer T1 by using the inductor L1. After connected, a source of the switch S10 and a source of the switch S12 are used as the other first input/output end of the DC/DC conversion module 30 to connect to the other end of the bus capacitor C0. A source of the switch S13 is connected to a drain of the switch S14, and the source of the switch S13 is connected to a secondary side of the transformer T1 by using the filter capacitor C2. After connected, a drain of the switch S13, a drain of the switch S15, and one end of the capacitor C3 are used as one second input/output end of the DC/DC conversion module 30 to connect to one end of the traction battery. A source of the switch S15 is connected to a drain of the switch S16 and the secondary side of the transformer T1. After connected, a source of the switch S14, a source of the switch S16, and the other end of the capacitor C3 are used as the other second input/output end of the DC/DC conversion module 30 to connect to the other end of the traction battery. The secondary side of the transformer T1 is connected to a drain of the switch S17 and a drain of the switch S18. After connected, a source of the switch S17, a source of the switch S18, and one end of the capacitor C4 are used as one third input/output end of the DC/DC conversion module 30 to connect to one end of the auxiliary battery. A midpoint of the secondary side of the transformer T1 is connected to one end of the inductor L2. After connected, the other end of the inductor L2 and the other end of the capacitor C4 are used as the other third input/output end of the DC/DC conversion module 30 to connect to the other end of the auxiliary battery. The DC/DC conversion module 30 may be an LLC resonant circuit, and the filter capacitor C1, the inductor L1, and the transformer T1 may form an LLC resonant network. In this way, zero-voltage switching of switches (such as the switches S9 to S12) on a primary side of a transformer (such as the transformer T1) can be implemented within a wide load range, thereby achieving higher energy conversion efficiency and stronger applicability. Herein, two channels of outputs of the DC/DC conversion module 30 may share the transformer T1, thereby saving a circuit component and reducing costs.

Figure 7:
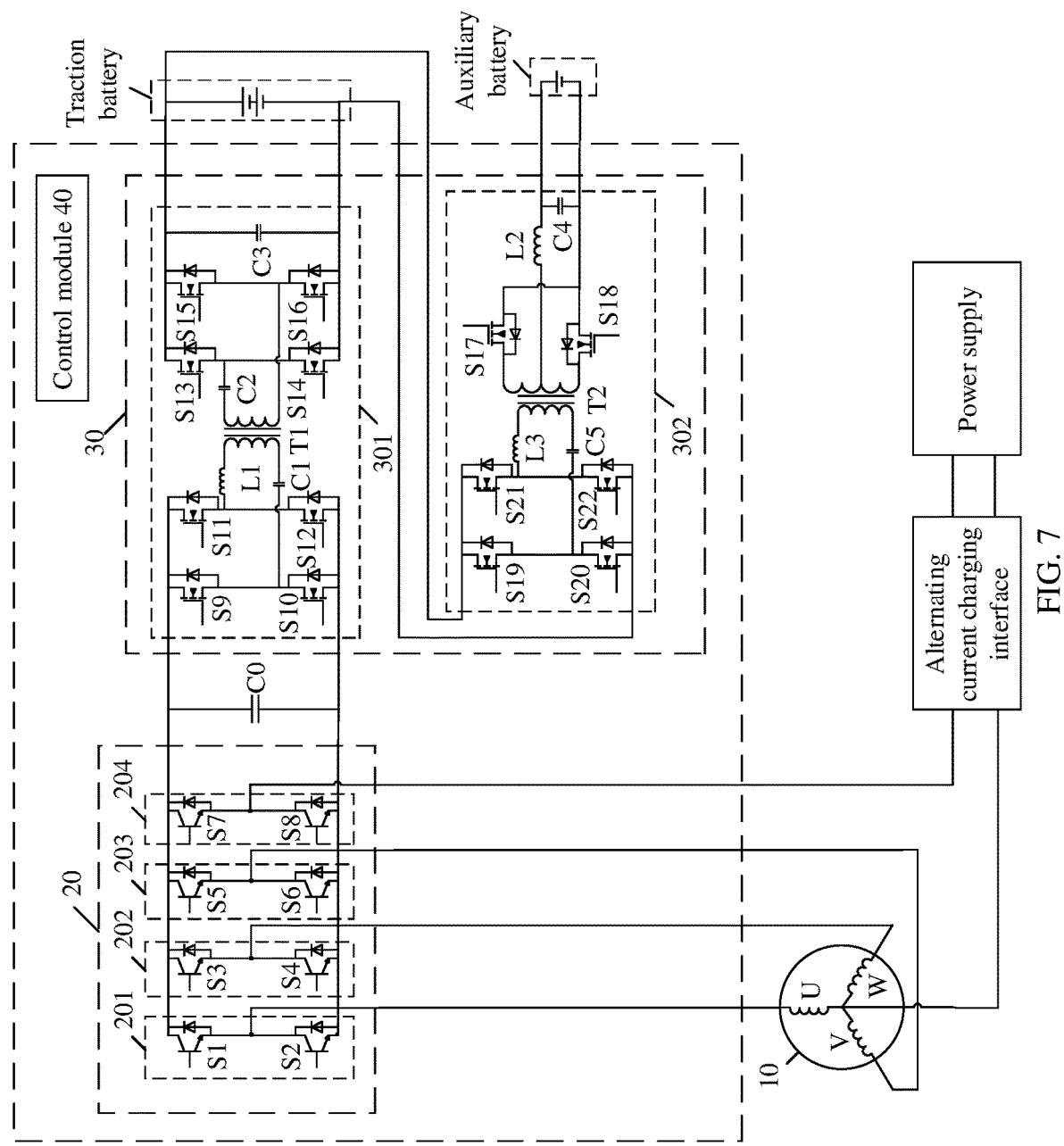
FIG. 7 is another schematic diagram of a structure of an energy conversion system.

In some feasible implementations, FIG. 7 is another schematic diagram of a structure of an energy conversion system. As shown in FIG. 7, the DC/DC conversion module 30 shown in FIG. 3 includes a first DC/DC conversion unit 301 and a second DC/DC conversion unit 302. Herein, the first DC/DC conversion unit 301 is a high-voltage/high-voltage conversion unit, and the second DC/DC conversion unit 302 is a high-voltage/low-voltage conversion unit. A first input/output end of the first DC/DC conversion unit 301 may be used as the first input/output end of the DC/DC conversion module 30. A second input/output end of the first DC/DC conversion unit 301 may be used as the second input/output end of the DC/DC conversion module 30 and connected in parallel to a first input/output end of the second DC/DC conversion unit 302 through the traction battery. A second input/output end of the second DC/DC conversion unit 302 may be used as the third input/output end of the DC/DC conversion module 30 to connect to the auxiliary battery. The first DC/DC conversion unit 301 includes a switch S9 to a switch S16, a filter capacitor C1 and a filter capacitor C2, an inductor L1, a transformer T1, and a capacitor C3. The first DC/DC conversion unit 301 further includes two first input/output ends and two second input/output ends. In the first DC/DC conversion unit 301, a source of the switch S9 is connected to a drain of the switch S10, and the source of the switch S9 is connected to a primary side of the transformer T1 by using the filter capacitor C1. After connected, a drain of the switch S9 and a drain of the switch S11 are used as one first input/output end of the first DC/DC conversion unit 301 to connect to one end of the bus capacitor C0. A source of the switch S11 is connected to a drain of the switch S12, and the source of the switch S11 is connected to the primary side of the transformer T1 by using the inductor L1. After connected, a source of the switch S10 and a source of the switch S12 are used as the other first input/output end of the first DC/DC conversion unit 301 to connect to the other end of the bus capacitor C0. A source of the switch S13 is connected to a drain of the switch S14, and the source of the switch S13 is connected to a secondary side of the transformer T1 by using the filter capacitor C2. After connected, a drain of the switch S13, a drain of the switch S15, and one end of the capacitor C3 are used as one second input/output end of the first DC/DC conversion unit 301 to connect to one end of the traction battery. A source of the switch S15 is connected to a drain of the switch S16 and the secondary side of the transformer T1. After connected, a source of the switch S14, a source of the switch S16, and the other end of the capacitor C3 are used as the other second input/output end of the first DC/DC conversion unit 301 to connect to the other end of the traction battery. The first DC/DC conversion unit 301 may be an LLC resonant circuit, and the filter capacitor C1, the inductor L1, and the transformer T1 may form an LLC resonant network. In this way, zero-voltage switching of switches (such as the switches S9 to S12) on a primary side of a transformer (such as the transformer T1) can be implemented within a wide load range, thereby achieving higher energy conversion efficiency and stronger applicability.

In some feasible implementations, as shown in FIG. 7, the second DC/DC conversion unit 302 includes a switch S17 to a switch S22, a filter capacitor C5, inductors L2 and L3, a transformer T2, and a capacitor C4. The second DC/DC conversion unit 301 further includes two first input/output ends and two second input/output ends. In the second DC/DC conversion unit 302, a source of the switch S19 is connected to a drain of the switch S20, and the source of the switch S19 is connected to a primary side of the transformer T2 by using the filter capacitor C5. After connected, a drain of the switch S19 and a drain of the switch S21 are used as one first input/output end of the second DC/DC conversion unit 302 to connect to one end of the traction battery. A source of the switch S21 is connected to a drain of the switch S22, and the source of the switch S21 is connected to the primary side of the transformer T2 by using the inductor L3. After connected, a source of the switch S20 and a source of the switch S22 are used as the other first input/output end of the second DC/DC conversion unit 302 to connect to the other end of the traction battery. A secondary side of the transformer T2 is connected to a drain of the switch S17 and a drain of the switch S18. After connected, a source of the switch S17, a source of the switch S18, and one end of the capacitor C4 are used as one second input/output end of the second DC/DC conversion unit 302 to connect to one end of the auxiliary battery. A midpoint of the secondary side of the transformer T2 is connected to one end of the inductor L2. After connected, the other end of the inductor L2 and the other end of the capacitor C4 are used as the other second input/output end of the second DC/DC conversion unit 302 to connect to the other end of the auxiliary battery. The second DC/DC conversion unit 302 may be an LLC resonant circuit, and the filter capacitor C5, the inductor L3, and the transformer T2 may form an LLC resonant network. In this way, zero-voltage switching of switches (such as the switches S19 to S22) on a primary side of a transformer (such as the transformer T2) can be implemented within a wide load range, thereby achieving higher energy conversion efficiency and stronger applicability. Herein, two channels of outputs of the DC/DC conversion module 30 may use two transformers (such as the transformer T1 and the transformer T2) independent of each other, so that the two channels of outputs can be precisely controlled to charge the auxiliary battery and the traction battery, thereby achieving stronger applicability. After the motor 10 is driven and the bus voltage is formed at the two ends of the bus capacitor C0, the first DC/DC conversion unit 301 may convert the bus voltage into a first direct current voltage to charge the traction battery, and the second DC/DC conversion unit 302 may perform voltage conversion on the first direct current voltage of the traction battery to charge the auxiliary battery.

In this way, the traction battery and the auxiliary battery are charged, and the motor is driven.

Figure 8:
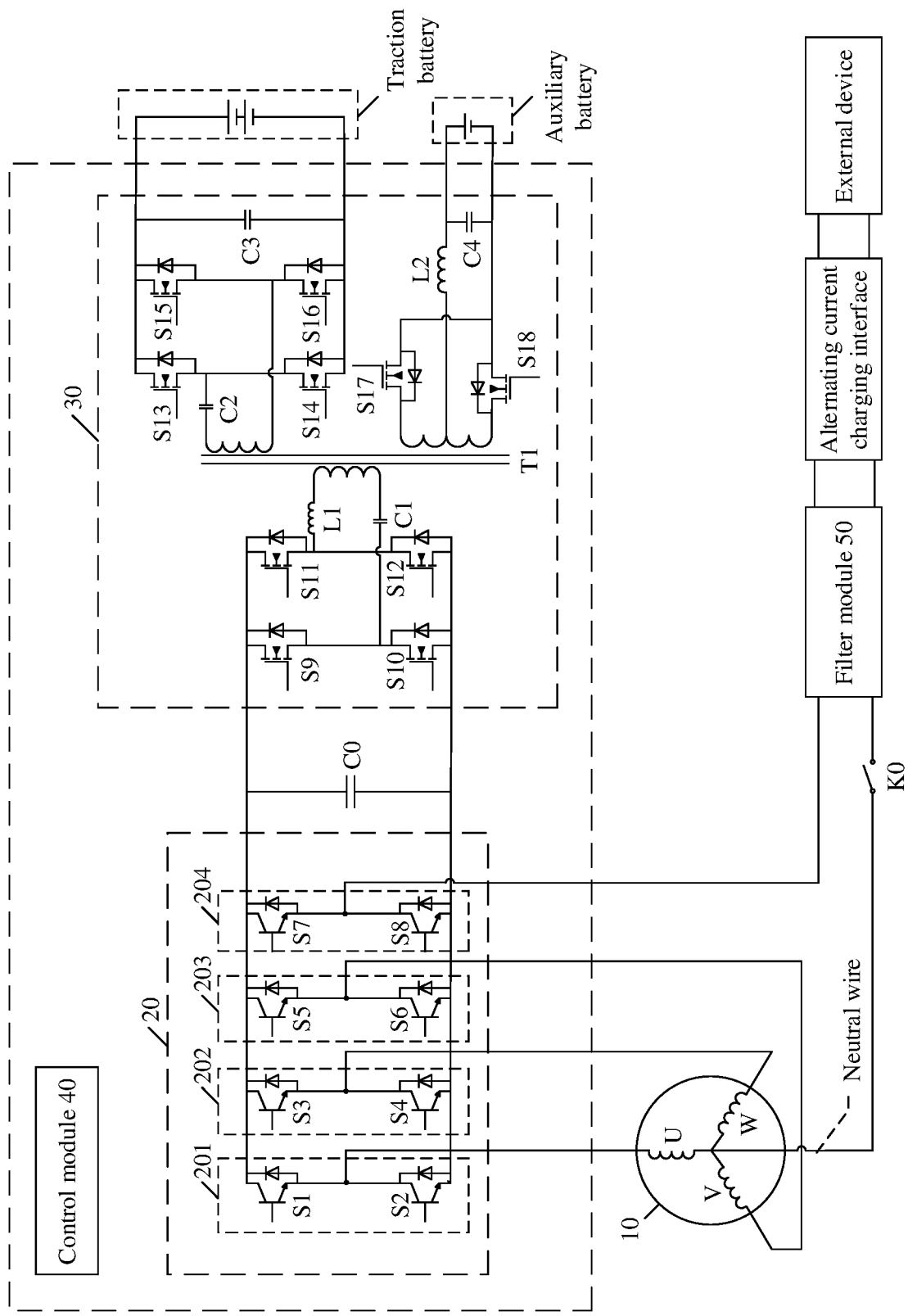
FIG. 8 is still another schematic diagram of a structure of an energy conversion system.

In some feasible implementations, FIG. 8 is still another schematic diagram of a structure of an energy conversion system. As shown in FIG. 8, the energy conversion system 1 shown in FIG. 6 further includes a first switch K0, and the neutral wire of the motor 10 may be connected to the alternating current charging interface through the first switch K0. Herein, the neutral wire of the motor 10 may be led out from a common connection end of the winding V, the winding U, and the winding W. Optionally, the bridge arm midpoint (that is, the first bridge arm midpoint) of the bridge arm switch 204 may also be connected to the alternating current charging interface through the first switch K0. This may be determined based on an actual application scenario and is not limited herein. When the alternating current charging interface is connected to an external device, the control module 40 controls the first switch K0 to be turned on, controls the DC/DC conversion module 30 to output a second direct current voltage to the bridge arm conversion module 20 based on the direct current voltage supplied by the traction battery, and controls the bridge arm conversion module 20 to convert the second direct current voltage into an alternating current voltage (for example, a 220 V alternating current), to drive the motor 10 and charge the external device, thereby effectively utilizing energy and further improving energy conversion efficiency.

Optionally, in some feasible implementations, as shown in FIG. 8, the energy conversion system 1 further includes a filter module 50, and the neutral wire of the motor 10 may be connected to the filter module 50 through the first switch K0. When the alternating current charging interface is connected to a power supply, the filter module 50 may filter a voltage signal supplied by the power supply and output the voltage signal to the bridge arm conversion module 20. The voltage signal herein may be used to determine an alternating current input voltage supplied by the power supply. The winding V, the winding U, the winding W, and the bridge arm switch 201 to the bridge arm switch 203 may constitute a PFC circuit. Therefore, the winding V, the winding U, and the winding W may be understood as an inductor in the PFC circuit, and the bridge arm switch 201 to the bridge arm switch 203 may be used as three high-frequency bridge arms in the PFC circuit, to implement a voltage conversion function. In a process of separately charging the traction battery and the auxiliary battery, the control module 40 may control the first switch K0 to be closed, control the winding V, the winding U, the winding W, and the bridge arm switch 201 to the bridge arm switch 203 to perform boost conversion on the alternating current input voltage supplied by the power supply, to output a direct current voltage to the DC/DC conversion module 30, and control the DC/DC conversion module 30 to charge the traction battery and the auxiliary battery based on the direct current voltage. Optionally, the control module 40 may perform three-channel interleaved control on the bridge arm switch 201 to the bridge arm switch 203 to output the direct current voltage to the DC/DC conversion module 30 based on the alternating current input voltage, and a switch in each channel of the bridge arm switch 201 to the bridge arm switch 203 controls a phase angle difference to be 120°, to achieve a smaller ripple current of the alternating current charging interface and stronger applicability. In a process of separately driving the motor 10, the control module 40 may control the first switch K0 to be open, control the DC/DC conversion module 30 to output a second direct current voltage to the bridge arm conversion module 20 based on the direct current voltage supplied by the traction battery, and control the bridge arm conversion module 20 to convert the second direct current voltage into an alternating current voltage, to drive the motor 10.

Figure 9:
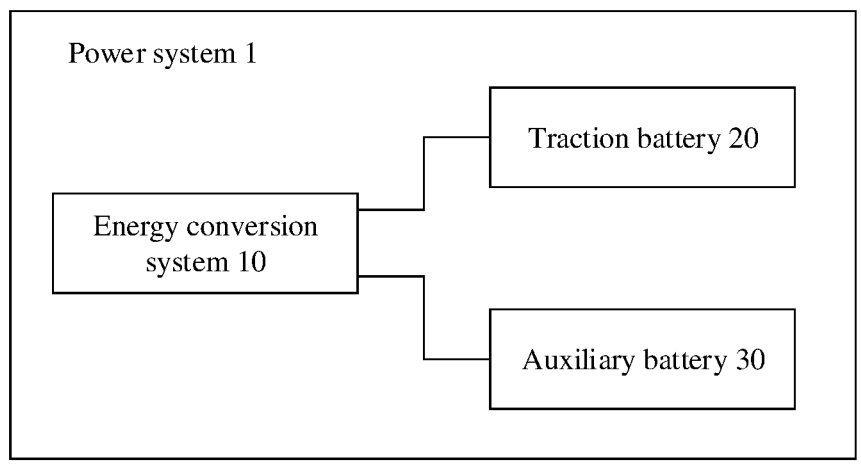
FIG. 9 is a schematic diagram of a structure of a power system.

Further, FIG. 9 is a schematic diagram of a structure of a power system. As shown in FIG. 9, the power system 1 includes an energy conversion system 10 (such as the energy conversion system 1), a traction battery 20, and an auxiliary battery 30. The traction battery herein may refer to a power supply that supplies power for an electric vehicle, and the traction battery may include a ternary lithium battery, a lithium iron phosphate battery, and other traction batteries. The energy conversion system 10 may charge the traction battery 20 and the auxiliary battery 30. After the traction battery 20 is charged, the traction battery 20 may supply direct current energy to a drive motor for vehicle driving in the electric vehicle, and the drive motor may convert the direct current energy supplied by the traction battery 20 into mechanical energy, to drive the electric vehicle to run.

Figure 10:
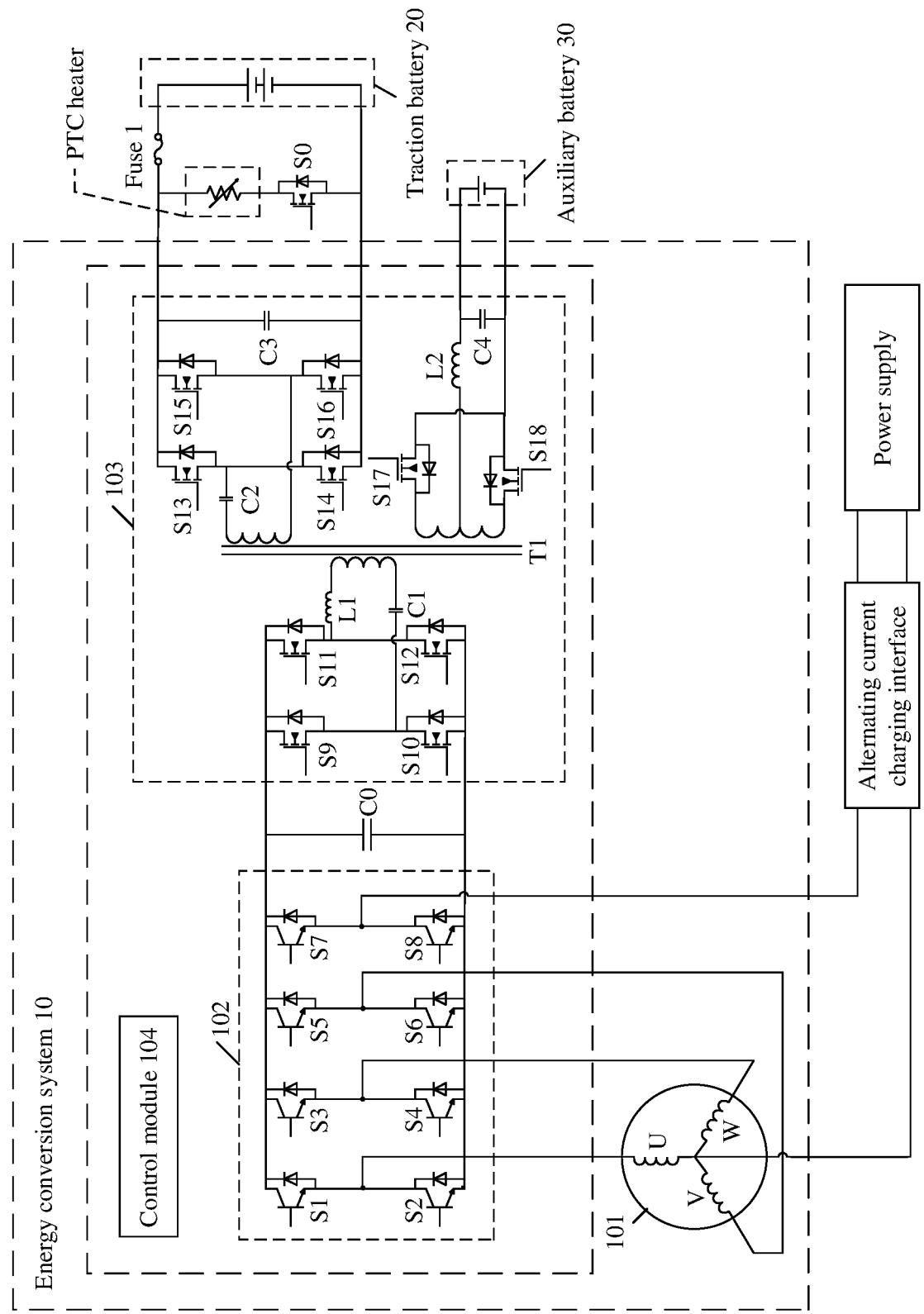
FIG. 10 is another schematic diagram of a structure of a power system.

FIG. 10 is another schematic diagram of a structure of a power system. As shown in FIG. 10, the power system 1 further includes a positive temperature coefficient heater (which may also be referred to as a PTC heater) and a second switch S0 connected in series. The PTC heater and the second switch S0 connected in series are connected in parallel to the traction battery 20. Optionally, the power system 1 further includes a fuse 1 (which may also be referred to as a cutout). The PTC heater and the second switch S0 connected in series may be connected in parallel to the traction battery 20 by using the fuse 1, and the fuse 1 may be configured for overcurrent protection of a circuit. The energy conversion system 10 shown in FIG. 9 includes a motor 101, a bridge arm conversion module 102, a DC/DC conversion module 103, and a control module 104. For circuit topologies of the bridge arm conversion module 102 and the DC/DC conversion module 103, refer to descriptions in FIG. 6. Details are not described herein again. When an alternating current charging interface is connected to a power supply, the control module 104 may control the second switch S0 to be turned on, control three phases of windings (that is, a winding V, a winding U, and a winding W) in the motor 101 and the bridge arm conversion module 102 to convert an alternating current input voltage of the power supply into a third direct current voltage, and control the DC/DC conversion module 103 to supply power to the PTC heater based on the third direct current voltage, so that the PTC heater works. Optionally, when the alternating current charging interface is not connected to a power supply, the control module 104 may control the second switch S0 to be turned on, and supply power to the PTC heater based on a direct current voltage supplied by the traction battery 20, so that the PTC heater works, to ensure that the power system 1 works normally in a low-temperature environment.

Figure 11:
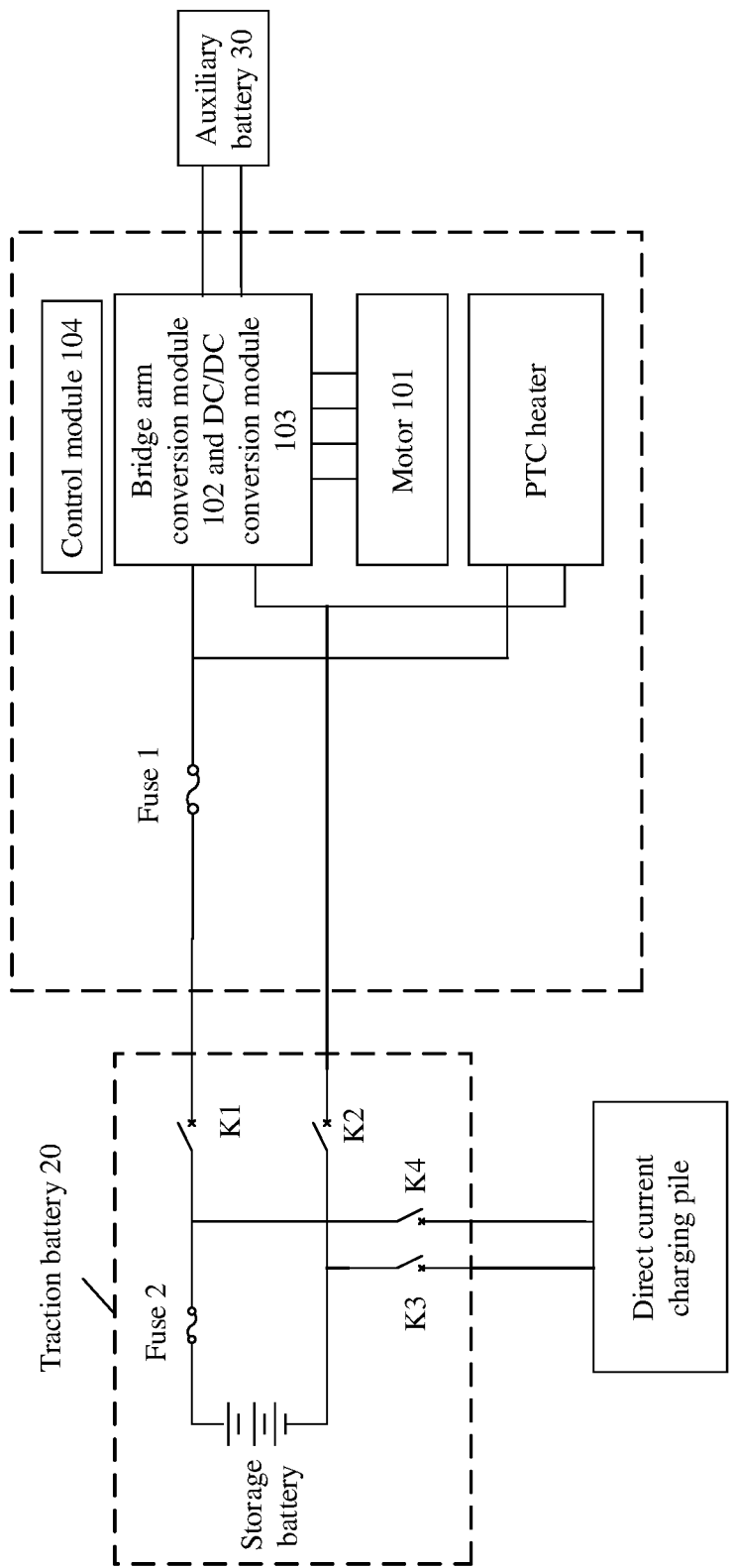
FIG. 11 is a schematic diagram of a high-voltage power link of a power system.

FIG. 11 is a schematic diagram of a high-voltage power link of a power system. As shown in FIG. 11, the traction battery 20 includes a main positive relay K1, a main negative relay K2, a direct current fast-charge relay K3, a direct current fast-charge relay K4, a storage battery, and a fuse 2. A positive electrode of the storage battery may be connected to one end of the main positive relay K1 and one end of the direct current fast-charge relay K4 by using the fuse 2, and a negative electrode of the storage battery may be connected to one end of the main negative relay K2 and one end of the direct current fast-charge relay K3. The other end of the direct current fast-charge relay K3 and the other end of the direct current fast-charge relay K4 may be connected to a direct current charging pile. When the direct current charging pile performs direct current fast charge on the traction battery 20, both the direct current fast-charge relay K3 and the direct current fast-charge relay K4 are closed. When the direct current charging pile does not perform direct current fast charge on the traction battery 20, both the direct current fast-charge relay K3 and the direct current fast-charge relay K4 are open, and both the main positive relay K1 and the main negative relay K2 are closed. In this case, the control module 104 may control the three phases of windings in the motor 101 and the bridge arm conversion module 102 to convert the alternating current input voltage into the third direct current voltage and control the DC/DC conversion module 103 to supply power to the traction battery 20, the auxiliary battery 30, and the PTC heater based on the third direct current voltage. The motor 101 may be an air conditioner compressor motor in an electric vehicle. Herein, the bridge arm conversion module 102 and the DC/DC conversion module 103 may constitute an on-board charger (OBC) in the electric vehicle. As shown in FIG. 11, the control module 104 may perform integrated control on charging management of the traction battery 20 and the auxiliary battery 30 and heating, ventilation, and air conditioner management of the electric vehicle (such as the air conditioner compressor motor and the PTC heater), thereby avoiding use of a high-voltage power distribution unit (PDU) on the electric vehicle and reducing costs. In addition, the motor 101, the bridge arm conversion module 102, the DC/DC conversion module 103, and the PTC heater share the fuse 1 (that is, a high-voltage fuse), which simplifies a high-voltage link, further reduces a size and costs of the electric vehicle and achieves high integration. Optionally, the control module 104 may further integrate with a function of a vehicle control unit (VCU) to detect a working state of each functional module in the power system 1, which further simplifies the high-voltage link of the power system and achieves stronger applicability.

Figure 12:
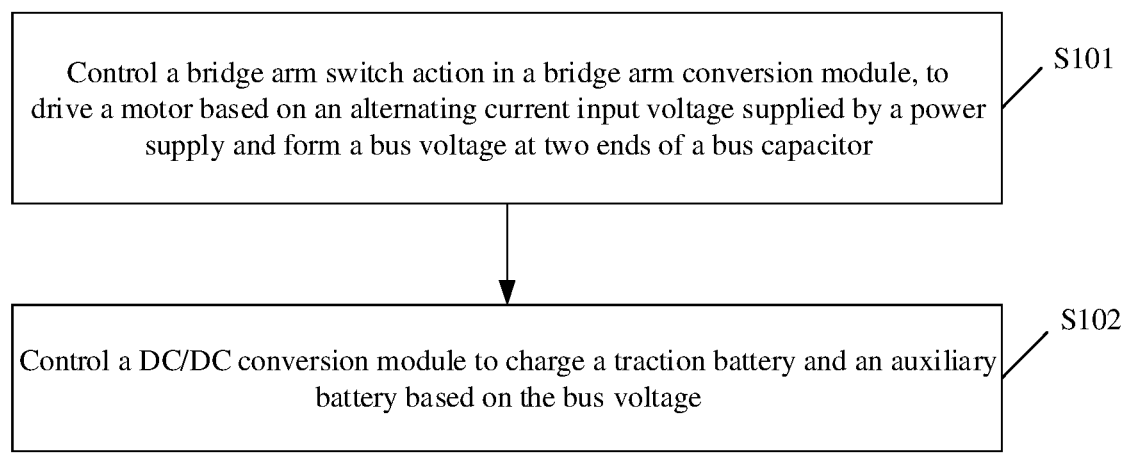
FIG. 12 is a schematic flowchart of an energy conversion method.

FIG. 12 is a schematic flowchart of an energy conversion method. The method is applicable to the control module in the energy conversion system (such as the energy conversion systems provided in FIG. 2 to FIG. 8). As shown in FIG. 12, the method includes the following steps S101 and S102.

Step S101: Control a bridge arm switch action in the bridge arm conversion module, to drive the motor based on an alternating current input voltage supplied by the power supply and form a bus voltage at the two ends of the bus capacitor.

In some feasible implementations, the control module may control upper bridge arm switches and lower bridge arm switches in bridge arm switches to be turned on or off, to drive the motor based on the alternating current input voltage supplied by the power supply and form the bus voltage at the two ends of the bus capacitor. The control module may obtain a current required by the motor to reach a target rotational speed and a target torque and an alternating current input current supplied by the power supply, and determine three phases of currents of the three phases of windings based on the current required by the motor to reach the target rotational speed and the target torque and the alternating current input current. Herein, the target torque and the target rotational speed may be parameters configured by the energy conversion system or parameters configured by a user. Further, the control module may obtain a charging voltage and a charging current that are required by the traction battery and the auxiliary battery and a bus voltage required by the bus capacitor, generate a control signal of the upper bridge arm switches and the lower bridge arm switches in the bridge arm switches based on the charging voltage and the charging current that are required by the traction battery and the auxiliary battery, the bus voltage required by the bus capacitor, and the three phases of currents, and control, based on the control signal, the upper bridge arm switches and the lower bridge arm switches in the bridge arm switches to be turned on or off, to drive the motor based on the alternating current input voltage supplied by the power supply and form the bus voltage at the two ends of the bus capacitor. The control signal herein may be a pulse width modulation signal. In the control signal, 1 indicates a switch to be turned on, and 0 indicates a switch to be turned off.

Optionally, in some feasible implementations, the control module may collect three phases of currents of the three phases of windings and a bus voltage of the bus capacitor. For example, the control module may collect the three phases of currents of the three phases of windings based on a current detection circuit and collect the bus voltage of the bus capacitor based on a voltage detection circuit. Further, the control module may generate a control signal of the upper bridge arm switches and the lower bridge arm switches in the bridge arm switches based on the three phases of currents, the bus voltage, and the alternating current input voltage supplied by the power supply, and control, based on the control signal, the upper bridge arm switches and the lower bridge arm switches in the bridge arm switches to be turned on or off, to drive the motor based on the alternating current input voltage supplied by the power supply and form the bus voltage at the two ends of the bus capacitor.

In some feasible implementations, for ease of description, the following provides a description by using an example in which the control signal is a switch duty cycle, and the three phases of windings include the winding V, the winding U, and the winding W. Details are not described below again. The control module may perform calculation based on a current $I_u$ of the winding U and the bus voltage (which may be represented as Udc) of the bus capacitor by using a motor control algorithm, to obtain a differential mode voltage V1 required by the winding U; perform calculation based on a current $I_w$ of the winding W and the bus voltage Udc by using the motor control algorithm to obtain a differential mode voltage V2 required by the winding W; and perform calculation based on a current $I_v$ of the winding V and the bus voltage Udc by using the motor control algorithm to obtain a differential mode voltage V3 required by the winding V. Further, the control module may perform calculation based on the current $I_v$ of the winding V, the current $I_u$ of the winding U, the current $I_w$ of the winding W, the bus voltage Udc, and the alternating current input voltage (Uac) of the power supply by using a PFC control algorithm, to obtain a common mode voltage Vpfc. In this case, the control module may determine switch duty cycles of the upper bridge arm switches and the lower bridge arm switches in the bridge arm switches based on the differential mode voltage V1, the differential mode voltage V2, the differential mode voltage V3, the common mode voltage Vpfc, and the bus voltage Udc. The control module may determine an intermediate duty cycle (which may be represented as Dpfc) based on the common mode voltage Vpfc and the bus voltage Udc, for example, Dpfc=Vpfc/Udc. The intermediate duty cycle Dpfc may be used to calculate the switch duty cycles of the bridge arm switches. Further, the control module may determine a difference between 0.5 and the intermediate duty cycle Dpfc as a switch duty cycle (which may be represented as D0=0.5−Dpfc, where D0 is greater than or equal to 0 and is less than or equal to 1) of the first bridge arm switch, and determine switch duty cycles (as described above, D1=V1/Udc+Dpfc+D0, D2=V2/Udc+Dpfc+D0, and D3=V3/Udc+Dpfc+D0) of the second bridge arm switches based on the switch duty cycle D0, the differential mode voltage V1 to the differential mode voltage V3, the intermediate duty cycle Dpfc, and the bus voltage Udc. After obtaining the switch duty cycles of the bridge arm switches, the control module may control, based on the switch duty cycles (for example, D0, D1, D2, and D3) of the bridge arm switches, the upper bridge arm switches and the lower bridge arm switches in the bridge arm switches to be turned on or off, to drive the motor based on the alternating current input voltage supplied by the power supply and form the bus voltage at the two ends of the bus capacitor. The bus voltage may be used to charge the traction battery and the auxiliary battery.

Step S102: Control the DC/DC conversion module to charge the traction battery and the auxiliary battery based on the bus voltage.

In some feasible implementations, the control module may control the first DC/DC conversion unit to convert the bus voltage into a first direct current voltage to charge the traction battery. In this case, the control module may control the second DC/DC conversion unit to perform voltage conversion on the first direct current voltage of the traction battery to charge the auxiliary battery. In this way, the traction battery and the auxiliary battery are charged while the motor is driven. Optionally, when the alternating current charging interface is connected to an external device, the control module may control the first switch to be turned on, control the DC/DC conversion module to output a second direct current voltage to the bridge arm conversion module based on the direct current voltage supplied by the traction battery, and control the bridge arm conversion module to convert the second direct current voltage into an alternating current voltage, to drive the motor and charge the external device, thereby improving energy conversion efficiency.

For more operations in the energy conversion method, refer to the energy conversion systems shown in FIG. 2 to FIG. 8 and implementations performed by the control module in the working principles of the energy conversion systems. Details are not described herein again.

The bridge arm conversion module and the DC/DC conversion module may be controlled to drive the motor and charge the traction battery and the auxiliary battery, thereby improving energy conversion efficiency. In addition, no large-current contactor needs to be added to a circuit, so that a circuit structure is simple, costs are low, and applicability is strong.

The foregoing descriptions are merely implementations of the embodiments but are not intended as limiting. Any variation or replacement readily figured out by a person skilled in the art shall fall within the scope, of the embodiments.

What is claimed is:

1. An energy conversion system, comprising:
a bridge arm conversion module;
a direct current to direct current (DC/DC) conversion module;
a motor;
a bus capacitor; and
a control module, wherein
a first bridge arm midpoint of the bridge arm conversion module is connected to an alternating current charging interface, other bridge arm midpoints of the bridge arm conversion module are respectively connected to three phases of windings in the motor, an input/output end of the bridge arm conversion module is connected in parallel to a first input/output end of the DC/DC conversion module through the bus capacitor, a second input/output end of the DC/DC conversion module is connected to a traction battery, a third input/output end of the DC/DC conversion module is connected to an auxiliary battery, a neutral wire of the motor is connected to the alternating current charging interface, the neutral wire of the motor is led out from a common connection end of the three phases of windings, and the alternating current charging interface is connected to a power supply; and
the control module is configured to:
control a bridge arm switch action in the bridge arm conversion module,
drive the motor based on an alternating current input voltage supplied by the power supply,
form a bus voltage at two ends of the bus capacitor,
control the DC/DC conversion module to charge the traction battery and the auxiliary battery based on the bus voltage.

2. The energy conversion system according to claim 1, wherein the bridge arm conversion module further comprises:
a first bridge arm switch; and
a plurality of second bridge arm switches connected in parallel, the first bridge arm switch is connected in parallel to the plurality of second bridge arm switches connected in parallel, and a parallel connection end between the first bridge arm switch and the plurality of second bridge arm switches connected in parallel is used as the input/output end of the bridge arm conversion module, wherein one bridge arm switch comprises an upper bridge arm switch and a lower bridge arm switch connected in series, a series connection point between the upper bridge arm switch and the lower bridge arm switch is a bridge arm midpoint of the bridge arm switch, a bridge arm midpoint of the first bridge arm switch is the first bridge arm midpoint, bridge arm midpoints of the plurality of second bridge arm switches are the other bridge arm midpoints, and a bridge arm midpoint of one of the plurality of second bridge arm switches is connected to one of the three phases of windings of the motor.

3. The energy conversion system according to claim 2, wherein the control module is further configured to:
control upper bridge arm switches and lower bridge arm switches in the bridge arm switches to be turned on or off.

4. The energy conversion system according to claim 3, wherein the control module is further configured to:
generate a control signal of the upper bridge arm switches and the lower bridge arm switches in the bridge arm switches, and
control, based on the control signal, the upper bridge arm switches and the lower bridge arm switches in the bridge arm switches to be turned on or off, wherein
the control signal is determined based on a charging voltage and a charging current that are required by the traction battery and the auxiliary battery, a bus voltage required by the bus capacitor, and three phases of currents of the three phases of windings, and the three phases of currents are determined based on a current required by the motor to reach a target rotational speed and a target torque and an alternating current input current supplied by the power supply.

5. The energy conversion system according to claim 3, wherein the control module is further configured to:
collect three phases of currents of the three phases of windings and a bus voltage of the bus capacitor,
generate a control signal of the upper bridge arm switches and the lower bridge arm switches in the bridge arm switches based on the three phases of currents, the bus voltage, and the alternating current input voltage supplied by the power supply, and
control, based on the control signal, the upper bridge arm switches and the lower bridge arm switches in the bridge arm switches to be turned on or off.

6. The energy conversion system according to claim 1, wherein the DC/DC conversion module further comprises:
a first DC/DC conversion unit; and
a second DC/DC conversion unit, a first input/output end of the first DC/DC conversion unit is used as the first input/output end of the DC/DC conversion module, a second input/output end of the first DC/DC conversion unit is used as the second input/output end of the DC/DC conversion module and connected in parallel to a first input/output end of the second DC/DC conversion unit through the traction battery, and a second input/output end of the second DC/DC conversion unit is used as the third input/output end of the DC/DC conversion module;
the first DC/DC conversion unit is configured to convert the bus voltage into a first direct current voltage to charge the traction battery; and
the second DC/DC conversion unit is configured to perform voltage conversion on the first direct current voltage of the traction battery to charge the auxiliary battery.

7. The energy conversion system according to claim 1, wherein the energy conversion system further comprises:
a first switch, and the first bridge arm midpoint of the bridge arm conversion module or the neutral wire of the motor is connected to the alternating current charging interface through the first switch; and
the control module is configured to: when the alternating current charging interface is connected to an external device,
control the first switch to be turned on,
control the DC/DC conversion module to output a second direct current voltage to the bridge arm conversion module based on the direct current voltage supplied by the traction battery, and
control the bridge arm conversion module to convert the second direct current voltage into an alternating current voltage to drive the motor and charge the external device.

8. An energy conversion method applicable to a control module in an energy conversion system comprising a bridge arm conversion module, a direct current to direct current (DC/DC) conversion module, a motor, a bus capacitor, and a control module, wherein
a first bridge arm midpoint of the bridge arm conversion module is connected to an alternating current charging interface, other bridge arm midpoints of the bridge arm conversion module are respectively connected to three phases of windings in the motor, an input/output end of the bridge arm conversion module is connected in parallel to a first input/output end of the DC/DC conversion module through the bus capacitor, a second input/output end of the DC/DC conversion module is connected to a traction battery, a third input/output end of the DC/DC conversion module is connected to an auxiliary battery, a neutral wire of the motor is connected to the alternating current charging interface, the neutral wire of the motor is led out from a common connection end of the three phases of windings, and the alternating current charging interface is connected to a power supply; and
the control module is configured to control a bridge arm switch action in the bridge arm conversion module, to drive the motor based on an alternating current input voltage supplied by the power supply and form a bus voltage at two ends of the bus capacitor, and control the DC/DC conversion module to charge the traction battery and the auxiliary battery based on the bus voltage;
and the method comprises:
controlling a bridge arm switch action in the bridge arm conversion module, to drive the motor based on an alternating current input voltage supplied by the power supply and form a bus voltage at the two ends of the bus capacitor; and
controlling the DC/DC conversion module to charge the traction battery and the auxiliary battery based on the bus voltage.

9. The method according to claim 8, further comprising:
controlling upper bridge arm switches and lower bridge arm switches in bridge arm switches to be turned on or off;
driving the motor based on the alternating current input voltage supplied by the power supply; and
forming the bus voltage at the two ends of the bus capacitor.

10. The method according to claim 9, further comprising:
obtaining a current required by the motor to reach a target rotational speed and a target torque and an alternating current input current supplied by the power supply;
determining three phases of currents of the three phases of windings based on the current required by the motor to reach the target rotational speed and the target torque and the alternating current input current; and
obtaining a charging voltage and a charging current that are required by the traction battery and the auxiliary battery and a bus voltage required by the bus capacitor;
generating a control signal of the upper bridge arm switches and the lower bridge arm switches in the bridge arm switches based on the charging voltage and the charging current that are required by the traction battery and the auxiliary battery, the bus voltage required by the bus capacitor, and the three phases of currents; and
controlling, based on the control signal, the upper bridge arm switches and the lower bridge arm switches in the bridge arm switches to be turned on or off.

11. The method according to claim 9, further comprising:
collecting three phases of currents of the three phases of windings and a bus voltage of the bus capacitor; and
generating a control signal of the upper bridge arm switches and the lower bridge arm switches in the bridge arm switches based on the three phases of currents, the bus voltage, and the alternating current input voltage supplied by the power supply; and
controlling, based on the control signal, the upper bridge arm switches and the lower bridge arm switches in the bridge arm switches to be turned on or off.

12. The method according to claim 8, further comprising:
controlling the first DC/DC conversion unit to convert the bus voltage into a first direct current voltage to charge the traction battery; and controlling the second DC/DC conversion unit to perform voltage conversion on the first direct current voltage of the traction battery to charge the auxiliary battery.

13. The method according to claim 8, further comprising:
when the alternating current charging interface is connected to an external device,
controlling the first switch to be turned on;
controlling the DC/DC conversion module to output a second direct current voltage to the bridge arm conversion module based on the direct current voltage supplied by the traction battery; and
controlling the bridge arm conversion module to convert the second direct current voltage into an alternating current voltage to drive the motor and charge the external device.

14. A power system comprising:
a traction battery;
an auxiliary battery; and
an energy conversion system, wherein the energy conversion system comprises
a bridge arm conversion module,
a direct current to direct current (DC/DC) conversion module,
a motor,
a bus capacitor, and
a control module, wherein
a first bridge arm midpoint of the bridge arm conversion module is connected to an alternating current charging interface, other bridge arm midpoints of the bridge arm conversion module are respectively connected to three phases of windings in the motor, an input/output end of the bridge arm conversion module is connected in parallel to a first input/output end of the DC/DC conversion module through the bus capacitor, a second input/output end of the DC/DC conversion module is connected to a traction battery, a third input/output end of the DC/DC conversion module is connected to an auxiliary battery, a neutral wire of the motor is connected to the alternating current charging interface, the neutral wire of the motor is led out from a common connection end of the three phases of windings, and the alternating current charging interface is connected to a power supply; and
the control module is configured to:
control a bridge arm switch action in the bridge arm conversion module,
drive the motor based on an alternating current input voltage supplied by the power supply,
form a bus voltage at two ends of the bus capacitor, and
control the DC/DC conversion module to charge the traction battery and the auxiliary battery based on the bus voltage.

15. The power system according to claim 14, wherein the bridge arm conversion module further comprises:
a first bridge arm switch; and
a plurality of second bridge arm switches connected in parallel, the first bridge arm switch is connected in parallel to the plurality of second bridge arm switches connected in parallel, and a parallel connection end between the first bridge arm switch and the plurality of second bridge arm switches connected in parallel is used as the input/output end of the bridge arm conversion module, wherein one bridge arm switch comprises an upper bridge arm switch and a lower bridge arm switch connected in series, a series connection point between the upper bridge arm switch and the lower bridge arm switch is a bridge arm midpoint of the bridge arm switch, a bridge arm midpoint of the first bridge arm switch is the first bridge arm midpoint, bridge arm midpoints of the plurality of second bridge arm switches are the other bridge arm midpoints, and a bridge arm midpoint of one of the plurality of second bridge arm switches is connected to one of the three phases of windings of the motor.

16. The power system according to claim 15, wherein the control module is further configured to:
control upper bridge arm switches and lower bridge arm switches in the bridge arm switches to be turned on or off.

17. The power system according to claim 16, wherein the control module is configured to generate a control signal of the upper bridge arm switches and the lower bridge arm switches in the bridge arm switches, and control, based on the control signal, the upper bridge arm switches and the lower bridge arm switches in the bridge arm switches to be turned on or off, wherein
the control signal is determined based on a charging voltage and a charging current that are required by the traction battery and the auxiliary battery, a bus voltage required by the bus capacitor, and three phases of currents of the three phases of windings, and the three phases of currents are determined based on a current required by the motor to reach a target rotational speed and a target torque and an alternating current input current supplied by the power supply.

18. The power system according to claim 16, wherein the control module is further configured to:
collect three phases of currents of the three phases of windings and a bus voltage of the bus capacitor,
generate a control signal of the upper bridge arm switches and the lower bridge arm switches in the bridge arm switches based on the three phases of currents, the bus voltage, and the alternating current input voltage supplied by the power supply, and
control, based on the control signal, the upper bridge arm switches and the lower bridge arm switches in the bridge arm switches to be turned on or off.

19. The power system according to claim 14, wherein the power system further comprises:
a positive temperature coefficient heater; and
a second switch connected in series, and the positive temperature coefficient heater and the second switch connected in series are connected in parallel to the traction battery; and
the control module is configured to control the second switch to be turned on, control the three phases of windings and the bridge arm conversion module to convert an alternating current input voltage of the power supply into a third direct current voltage, and control the DC/DC conversion module to supply power to the positive temperature coefficient heater based on the third direct current voltage, so that the positive temperature coefficient heater works.

20. The power system according to claim 14, wherein the power system further comprises:
a positive temperature coefficient heater; and
a second switch connected in series, and the positive temperature coefficient heater and the second switch connected in series are connected in parallel to the traction battery; and
the control module is configured to control the second switch to be turned on, and supply power to the positive temperature coefficient heater based on a direct current voltage supplied by the traction battery, so that the positive temperature coefficient heater works.

* * * * *